(12) United States Patent
Neumann et al.

(10) Patent No.: US 10,113,530 B2
(45) Date of Patent: Oct. 30, 2018

(54) METHODS AND SYSTEMS FOR REMOVING AND/OR INSTALLING WIND TURBINE ROTOR BLADES

(71) Applicant: General Electric Company, Schenectady, NY (US)

(72) Inventors: Ulrich Werner Neumann, Simpsonville, SC (US); Brent Hamilton Holloway, Simpsonville, SC (US); Stephanie Willman, Greenville, SC (US); Michael Cade Foster, Sweetwater, TX (US)

(73) Assignee: General Electric Company, Schenectady, NY (US)

( * ) Notice: Subject to any disclaimer, the term of this patent is extended or adjusted under 35 U.S.C. 154(b) by 783 days.

(21) Appl. No.: 14/538,891

(22) Filed: Nov. 12, 2014

(65) Prior Publication Data
US 2015/0233341 A1 Aug. 20, 2015

Related U.S. Application Data

(63) Continuation-in-part of application No. 14/185,058, filed on Feb. 20, 2014, now Pat. No. 9,638,163.

(51) Int. Cl.
| *F03D 1/00* | (2006.01) |
| *B66C 1/10* | (2006.01) |
| *B66C 1/66* | (2006.01) |
| *F03D 1/06* | (2006.01) |
| *F03D 13/10* | (2016.01) |
| *F03D 13/40* | (2016.01) |

(52) U.S. Cl.
CPC .............. *F03D 1/001* (2013.01); *B66C 1/108* (2013.01); *B66C 1/66* (2013.01); *F03D 1/0658* (2013.01); *F03D 13/10* (2016.05); *F03D 13/40* (2016.05); *Y02E 10/721* (2013.01); *Y10T 29/49337* (2015.01)

(58) Field of Classification Search
CPC ........ F03D 13/40; F03D 13/10; F03D 1/0658; B66C 1/108; B66C 1/66
See application file for complete search history.

(56) References Cited

U.S. PATENT DOCUMENTS 7,353,603 B2 4/2008 Wobben
7,735,290 B2 6/2010 Arsene
(Continued)

FOREIGN PATENT DOCUMENTS

CA 2692705 8/2010
EP 2345811 B1 10/2012
(Continued)

*Primary Examiner* — Moshe Wilensky
(74) *Attorney, Agent, or Firm* — Dority & Manning, P.A.

(57) ABSTRACT

In one aspect, a method for installing a blade sock onto a rotor blade of a wind turbine may generally include positioning the blade sock adjacent to a blade tip of the rotor blade, wherein the blade sock comprises a sock strap forming a closed-shape. In addition, the method may include moving the blade sock relative to the rotor blade such that the blade tip is received within the closed-shape formed by the sock strap and moving the blade sock spanwise along the rotor blade towards a blade root of the rotor blade until the blade sock is positioned at an intermediate location defined between the blade root and the blade tip, wherein the sock strap is configured to fit tightly around an outer perimeter of the rotor blade at the intermediate location.

9 Claims, 30 Drawing Sheets

(56) References Cited

U.S. PATENT DOCUMENTS

| | | |
|---|---|---|
| 7,785,073 B2 | 8/2010 | Wobben |
| 7,832,101 B2 | 11/2010 | Koesters |
| 7,877,934 B2 | 2/2011 | Livingston et al. |
| 8,033,791 B1 | 10/2011 | Watanabe |
| 8,052,396 B2 | 11/2011 | Wobben |
| 8,069,634 B2 | 12/2011 | Livingston et al. |
| 8,083,212 B2 | 12/2011 | Numajiri et al. |
| 8,118,552 B2 | 2/2012 | Nies |
| 8,191,253 B2 | 6/2012 | Vangsy |
| 8,240,962 B2 | 8/2012 | Livingston et al. |
| 8,360,398 B2 | 1/2013 | Diaz De Corcuera et al. |
| 8,528,735 B2 | 9/2013 | Nies |
| 8,562,302 B2 | 10/2013 | Bakhuis et al. |
| 8,584,355 B2 | 11/2013 | Holling |
| 8,595,931 B2 | 12/2013 | Riddell et al. |
| 8,602,700 B2 | 12/2013 | Johnson |
| 8,651,462 B2 | 2/2014 | Van Berlo et al. |
| 2007/0290426 A1 | 12/2007 | Trede et al. |
| 2009/0167023 A1 | 7/2009 | Nies |
| 2010/0139062 A1 | 6/2010 | Reed et al. |
| 2010/0254813 A1 | 10/2010 | Dawson et al. |
| 2011/0142636 A1 | 6/2011 | Curtin |
| 2012/0076663 A1 | 3/2012 | From |
| 2012/0137481 A1 | 6/2012 | Lindberg et al. |
| 2012/0217089 A1 | 8/2012 | Fenger |
| 2013/0025113 A1 | 1/2013 | Arocena De La Rua et al. |
| 2013/0074335 A1 | 3/2013 | Amano |
| 2013/0236316 A1 | 9/2013 | Bitsch et al. |
| 2013/0236324 A1 | 9/2013 | Bech et al. |
| 2013/0318789 A1 | 12/2013 | Gabeiras et al. |
| 2014/0010658 A1 | 1/2014 | Nielsen |
| 2014/0360015 A1 | 12/2014 | Lohan et al. |

FOREIGN PATENT DOCUMENTS

| | | |
|---|---|---|
| EP | 2369174 B1 | 11/2012 |
| EP | 2616670 A1 | 7/2013 |
| JP | 2006152862 A | 6/2006 |
| WO | WO 2011/064659 A3 | 6/2011 |
| WO | WO 2011/095167 A2 | 8/2011 |
| WO | WO 2012/065613 A1 | 5/2012 |

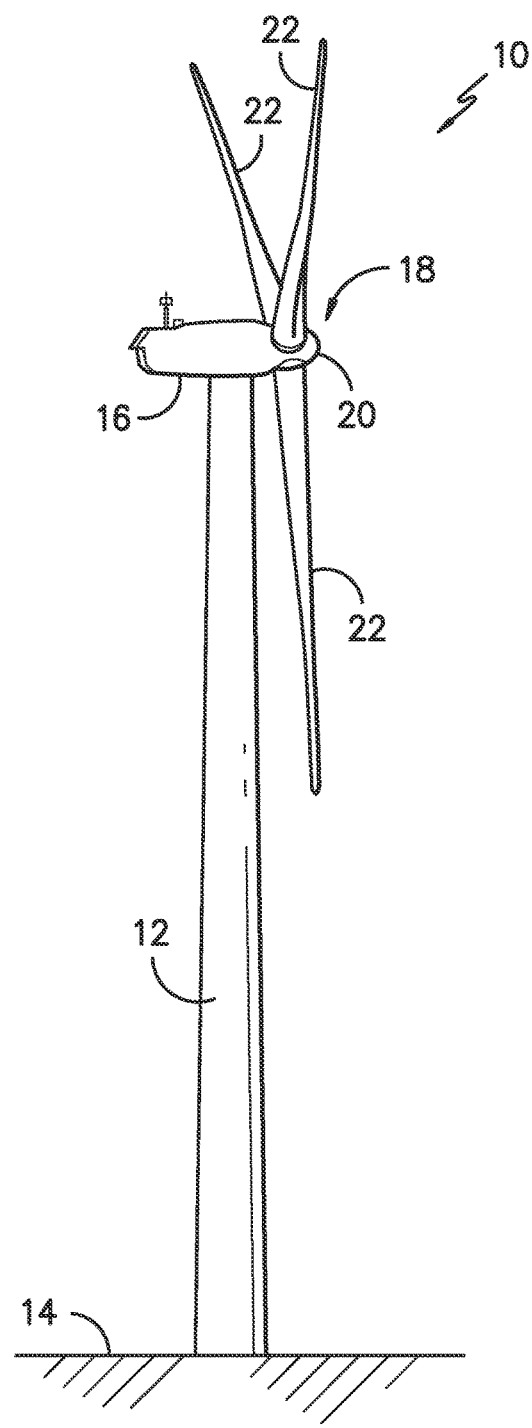
FIG. -1-

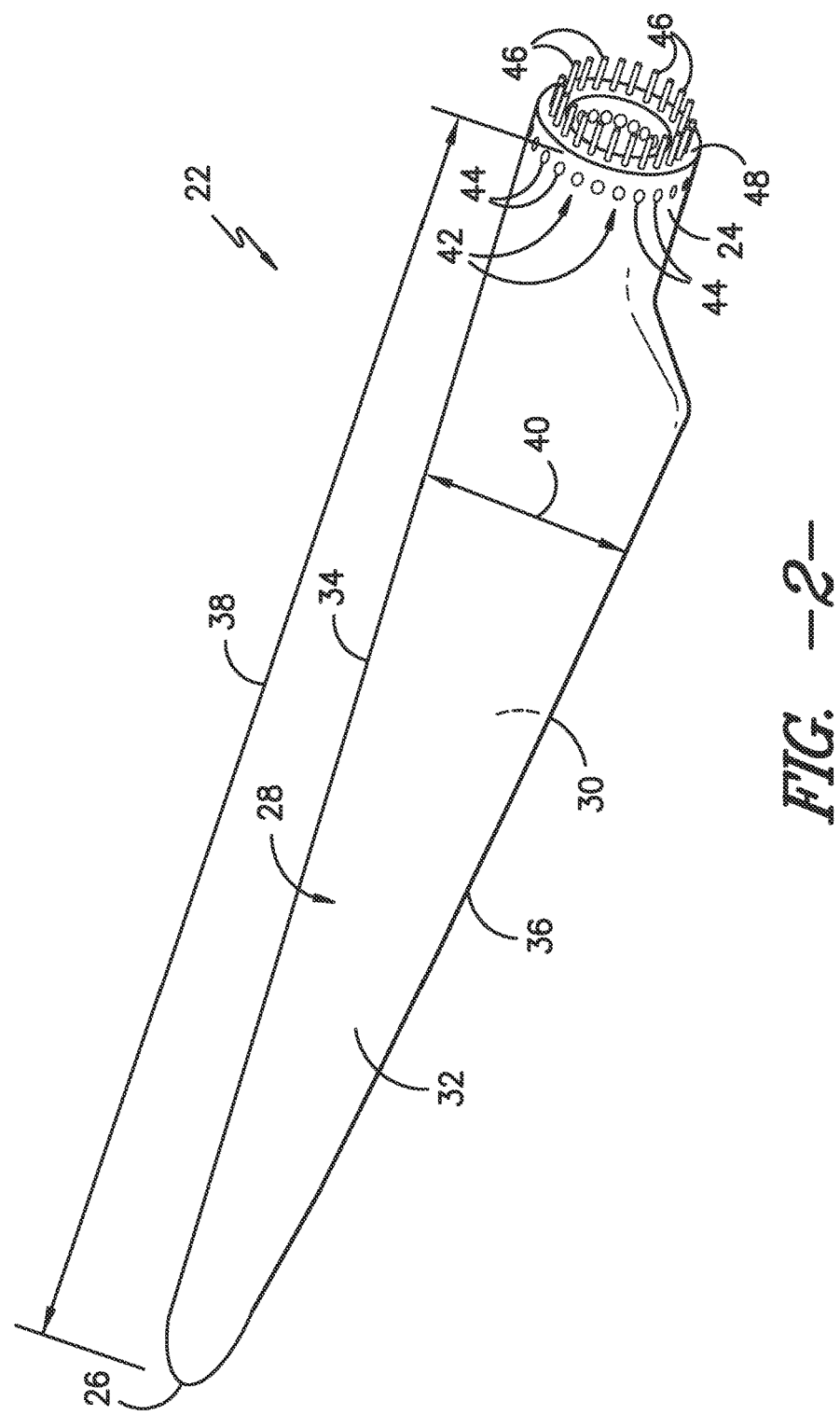
FIG. -2-

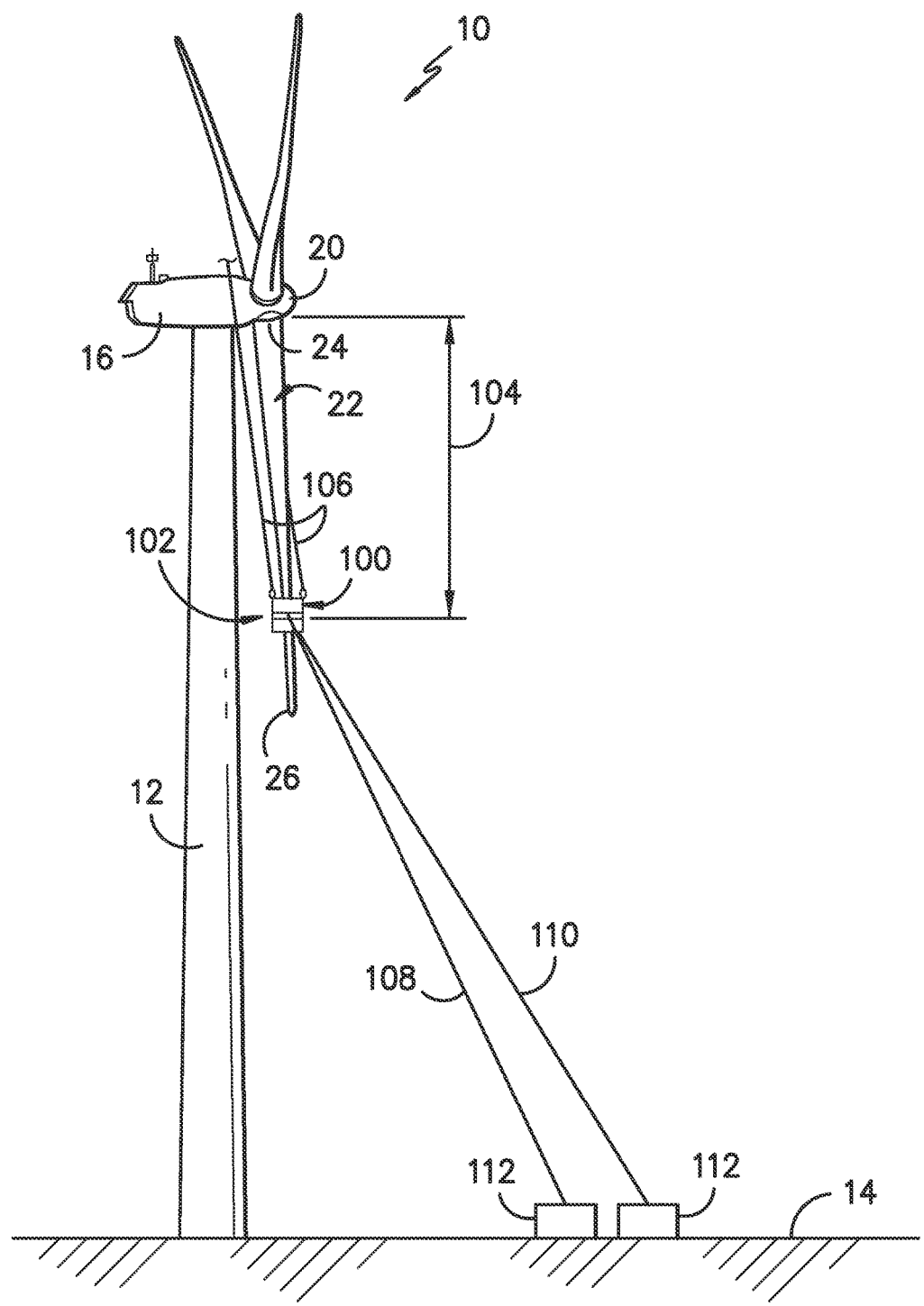
FIG. -3-

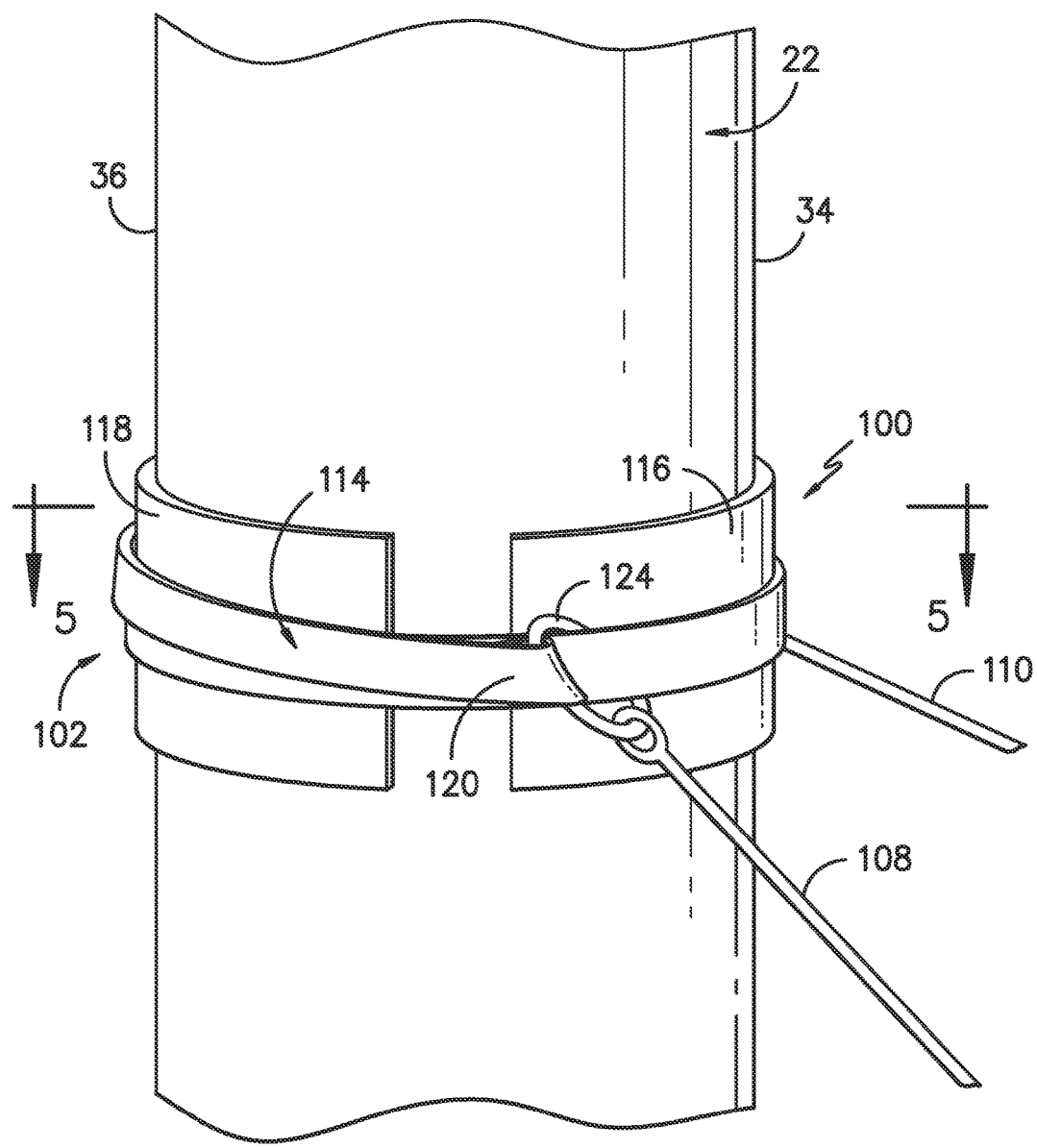
FIG. -4-

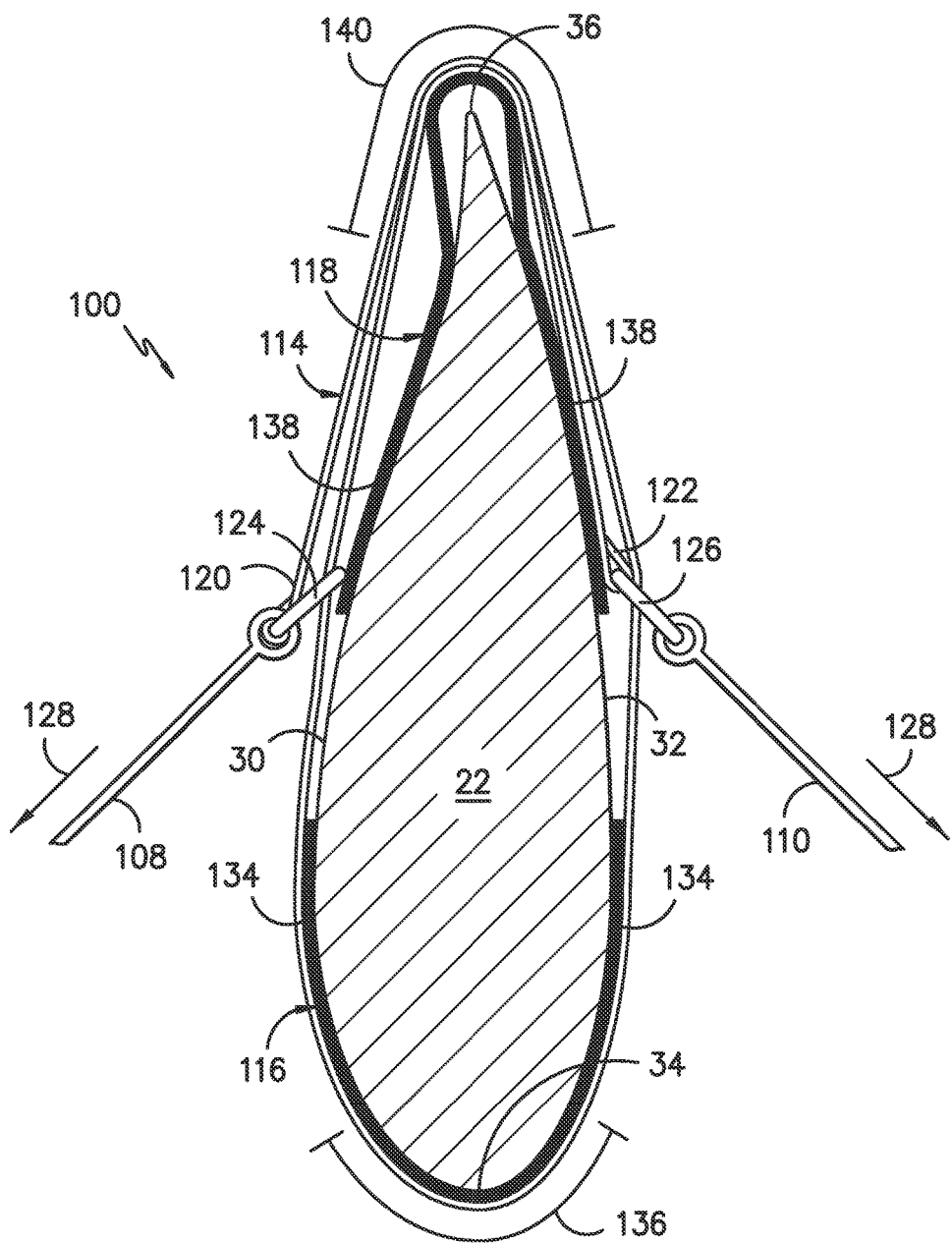
FIG. -5-

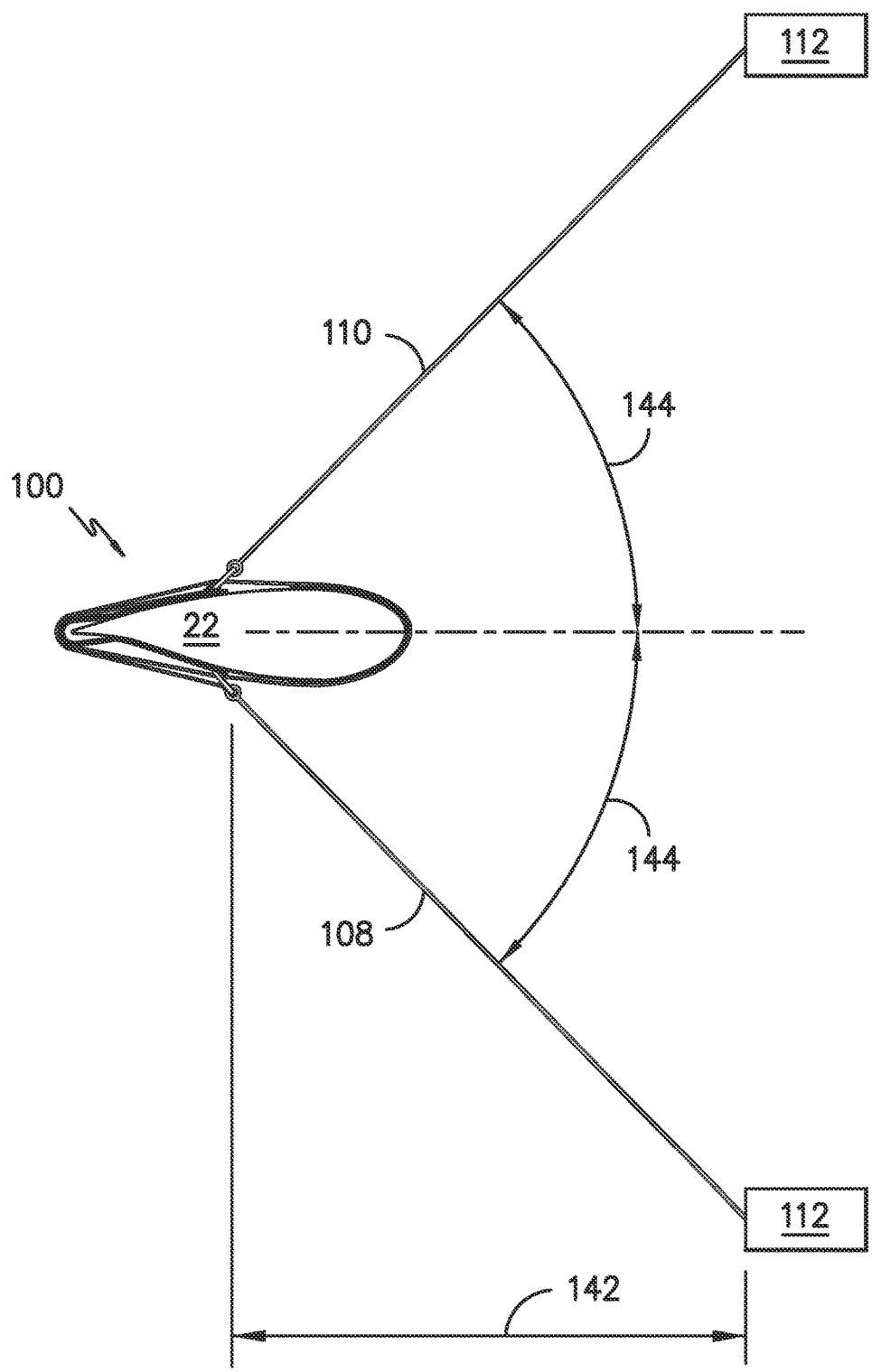
FIG. -6-

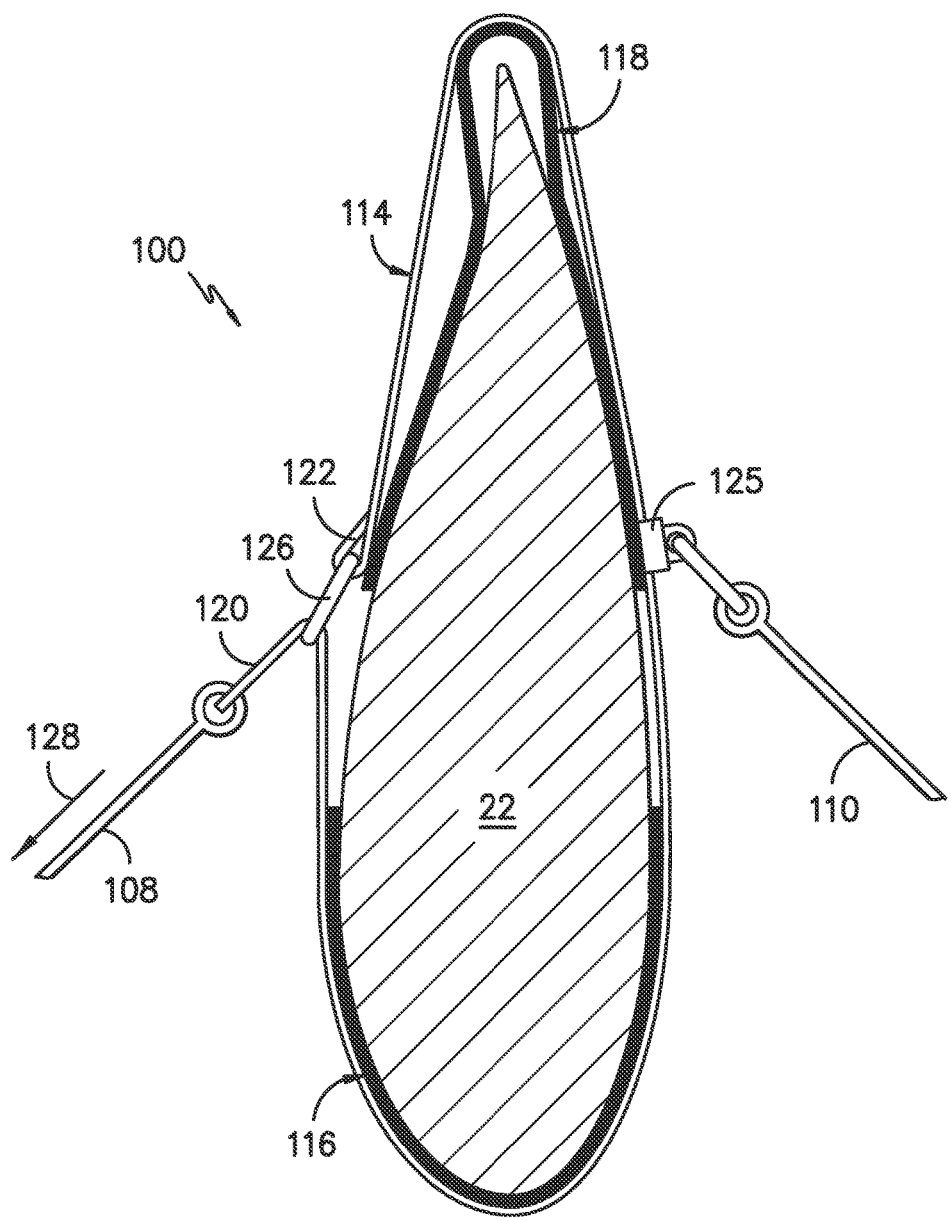
FIG. -7-

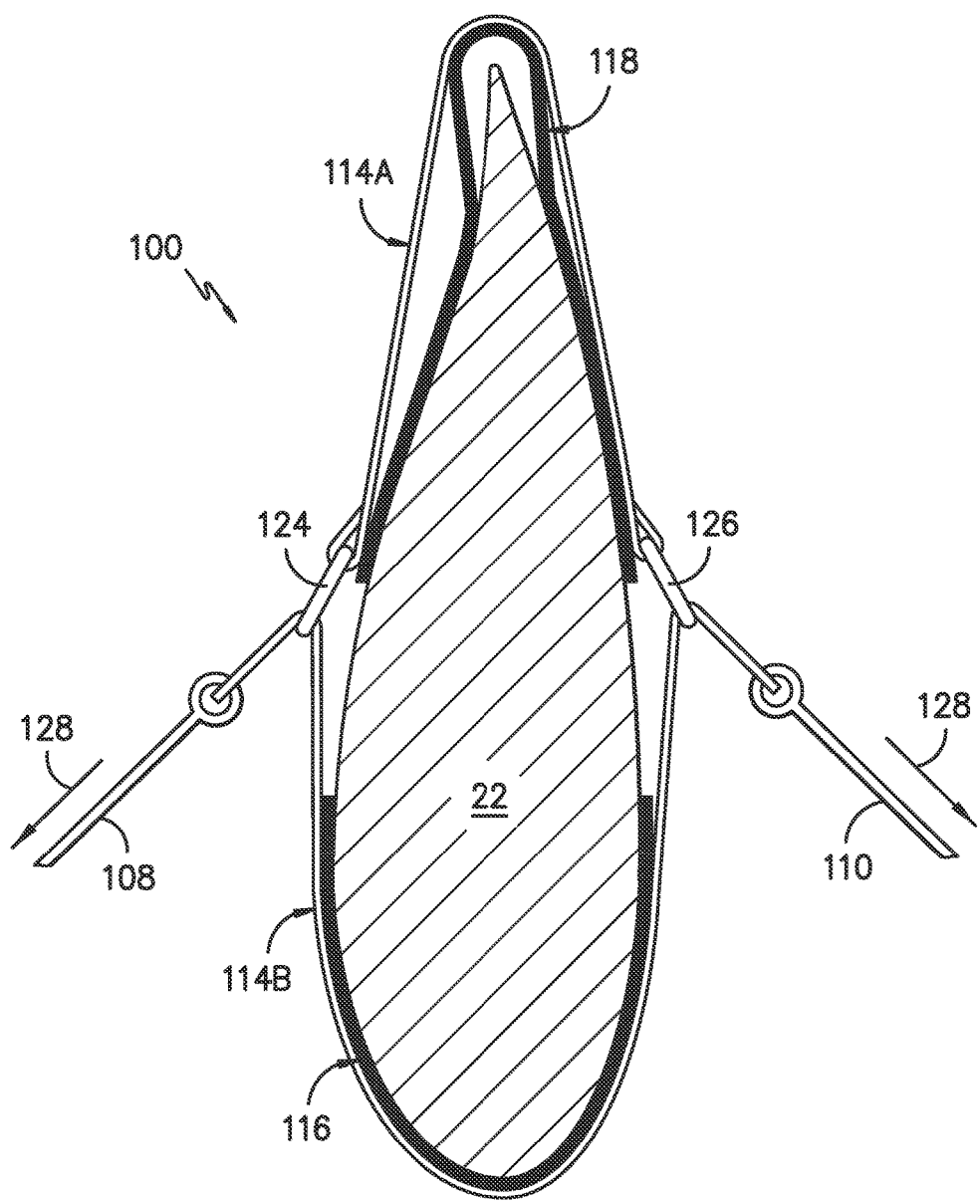
FIG. -8-

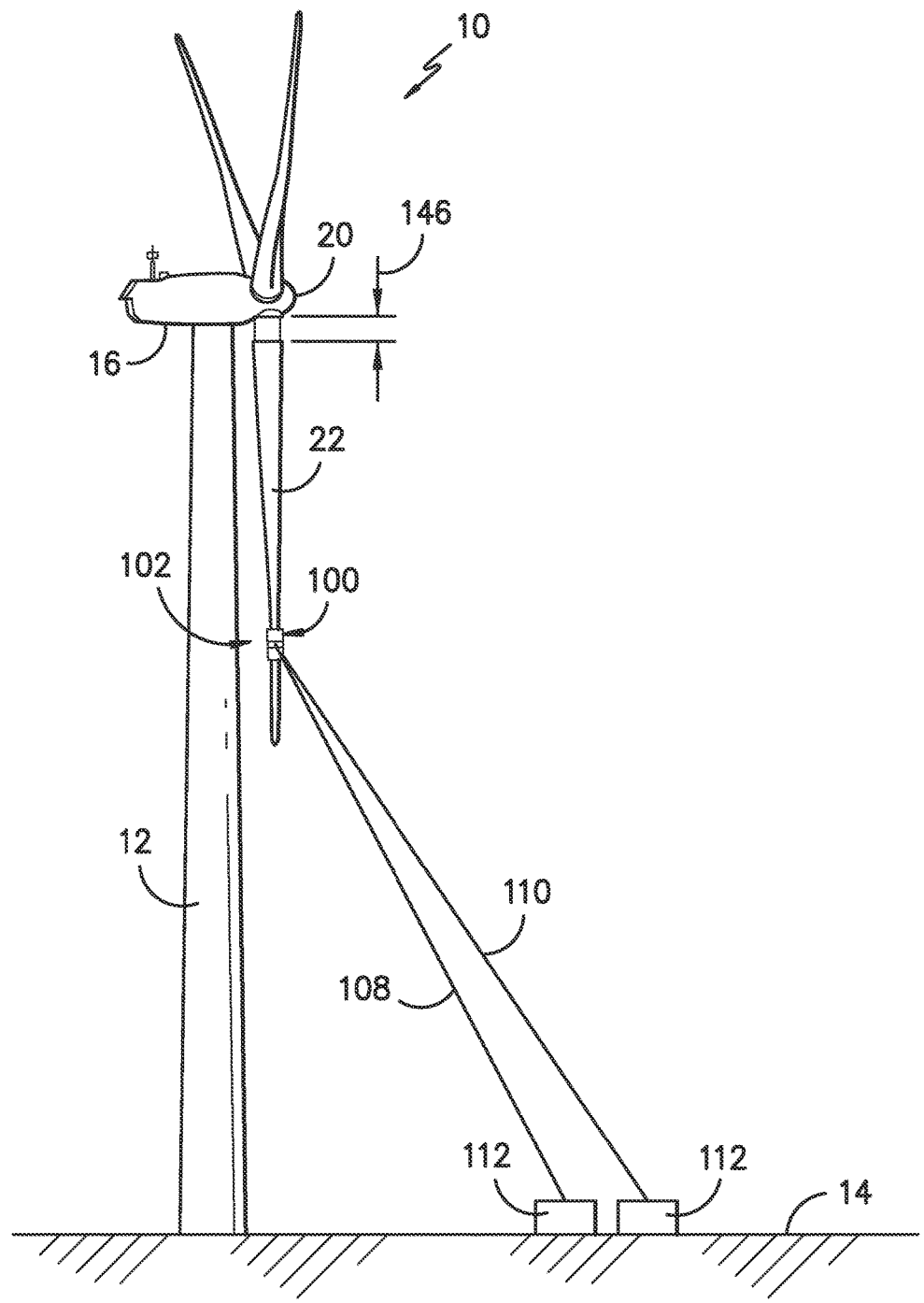
FIG. -9-

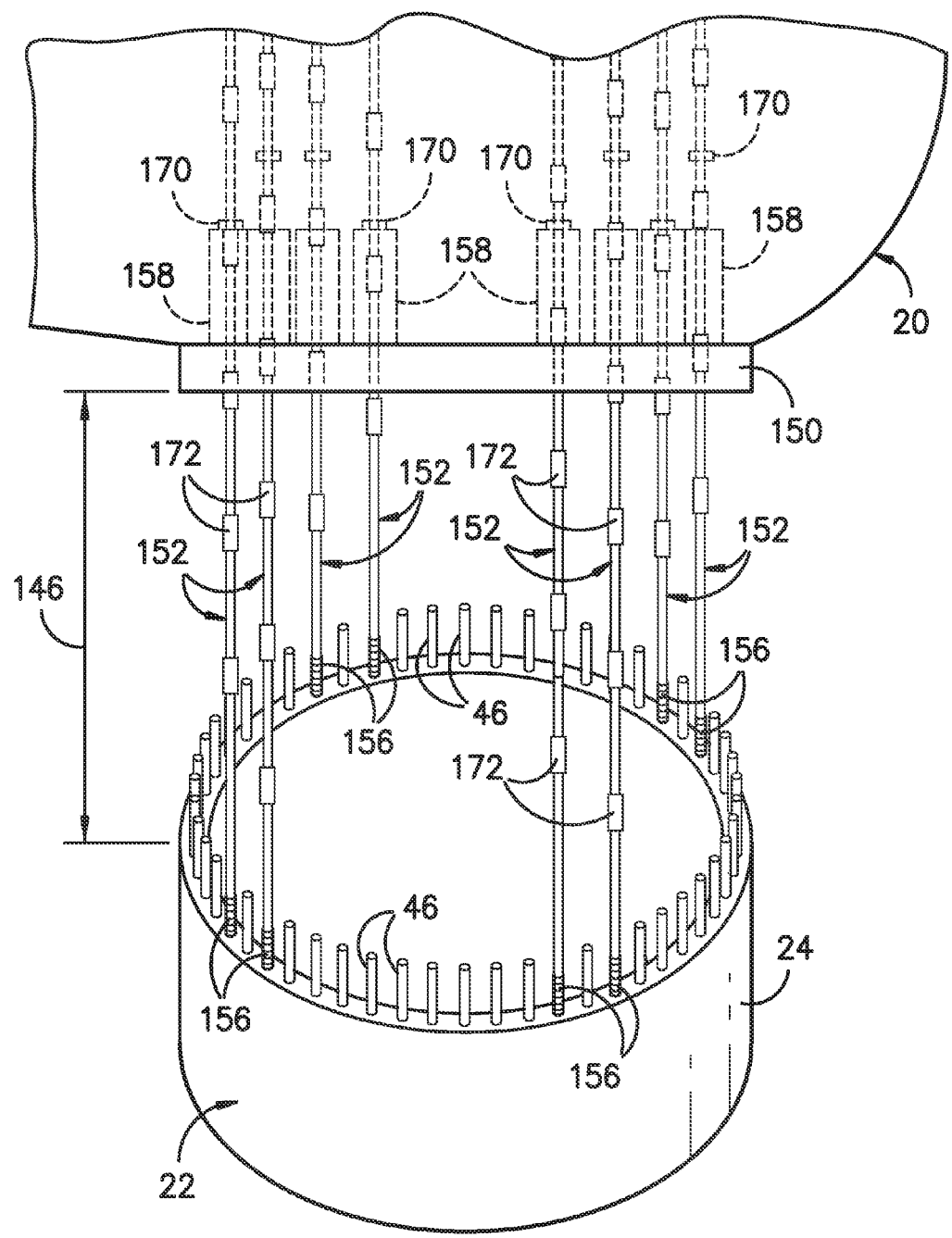
FIG. -10-

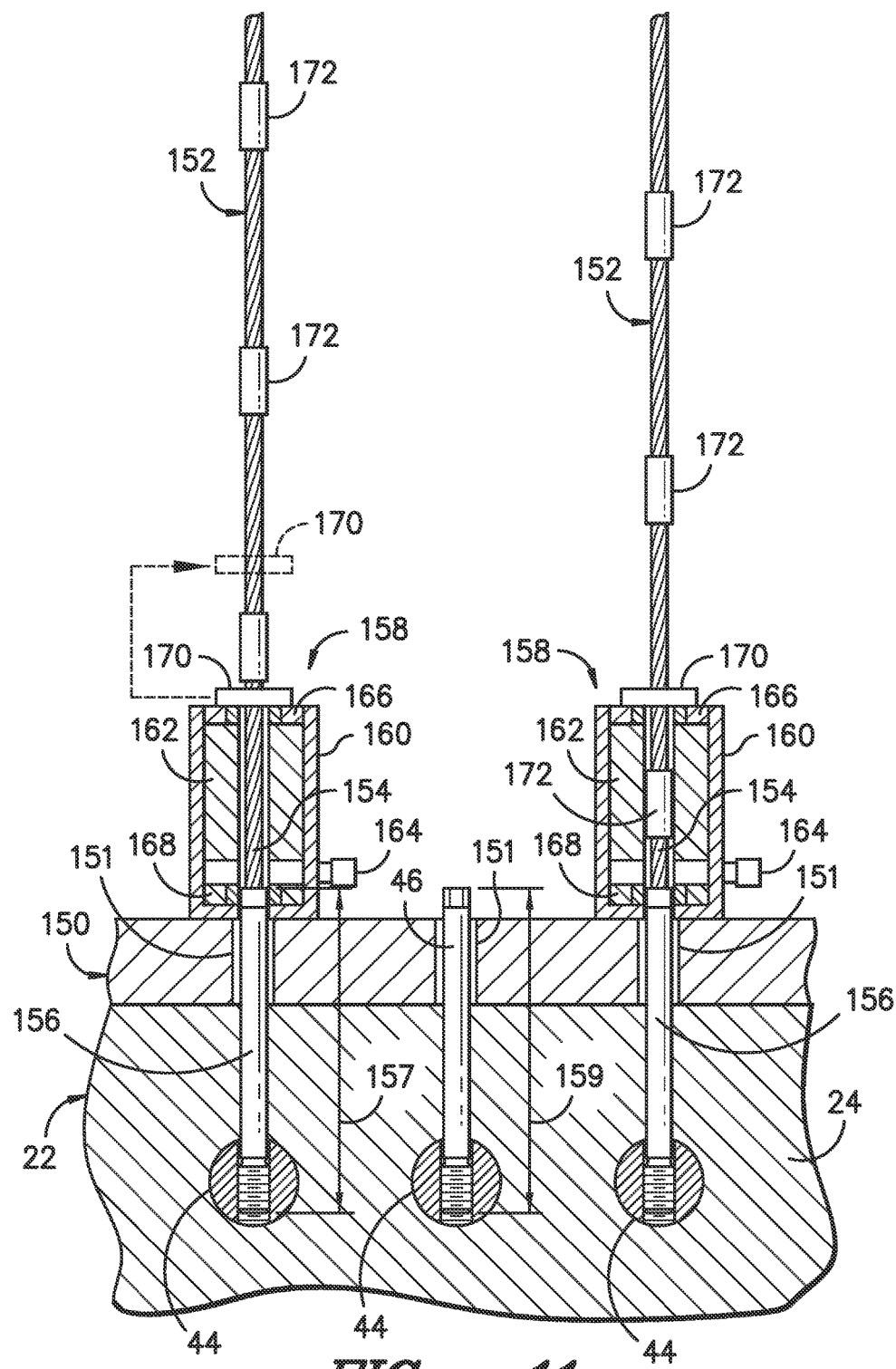
FIG. -11-

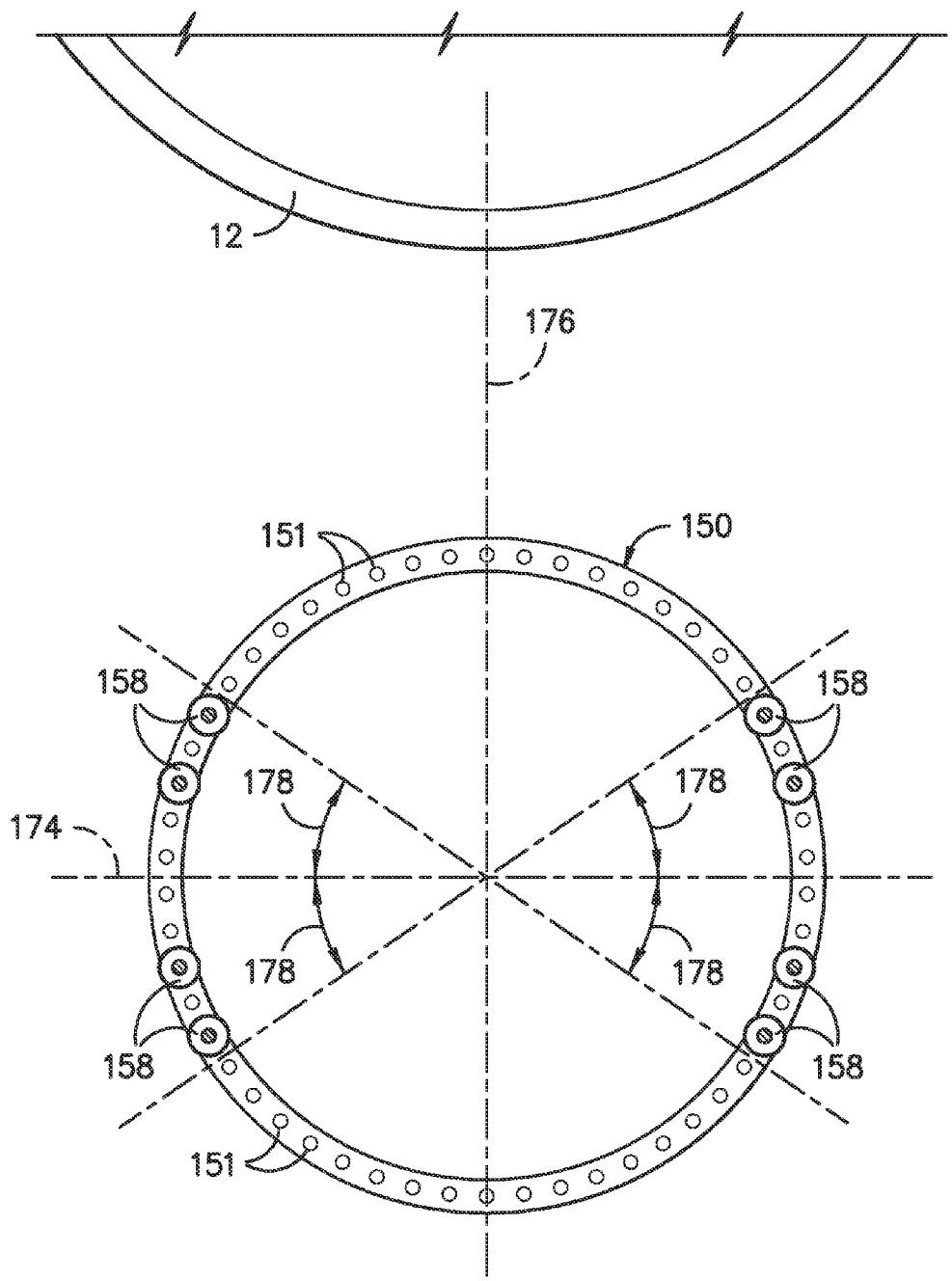
FIG. -12-

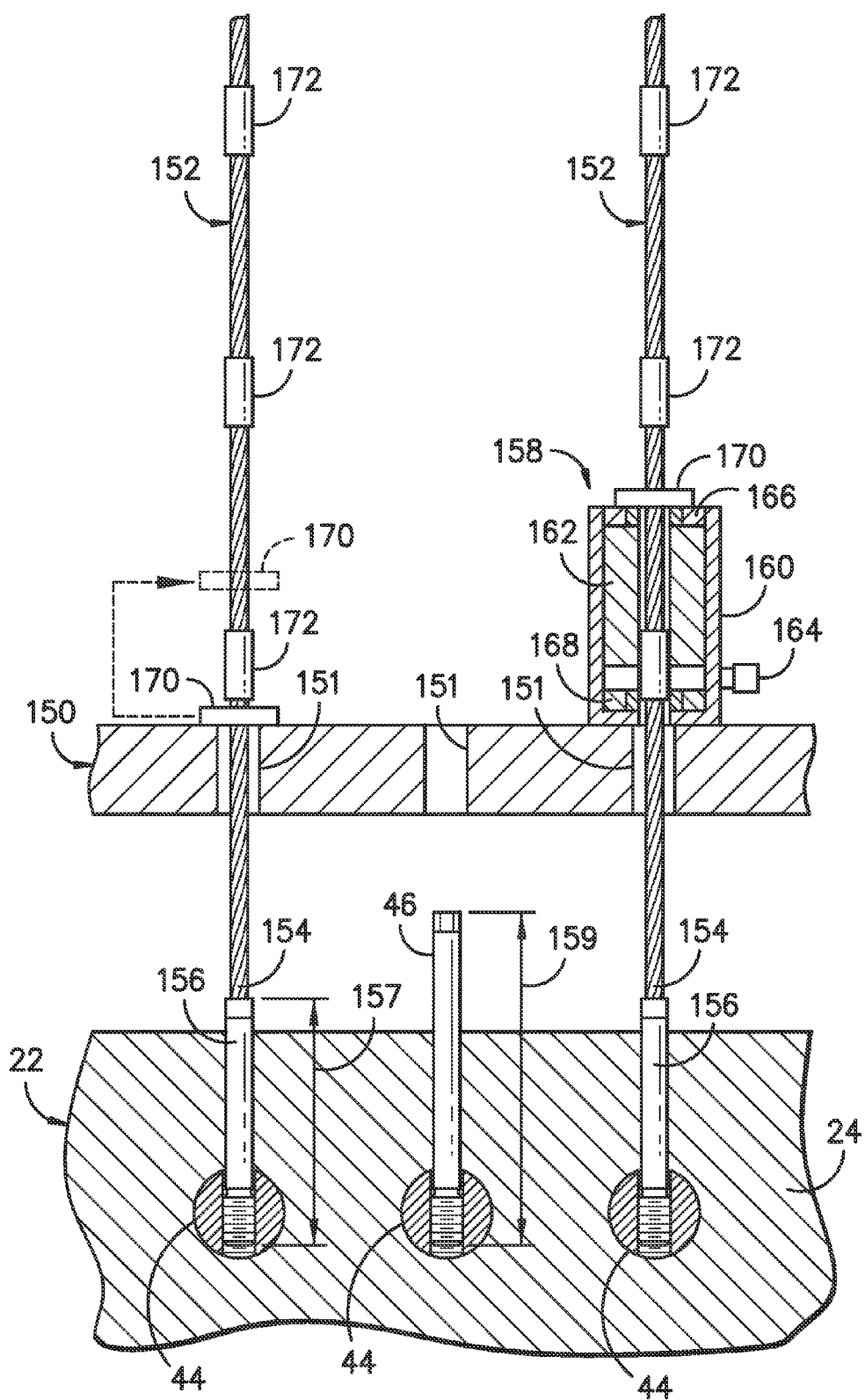
FIG. -13-

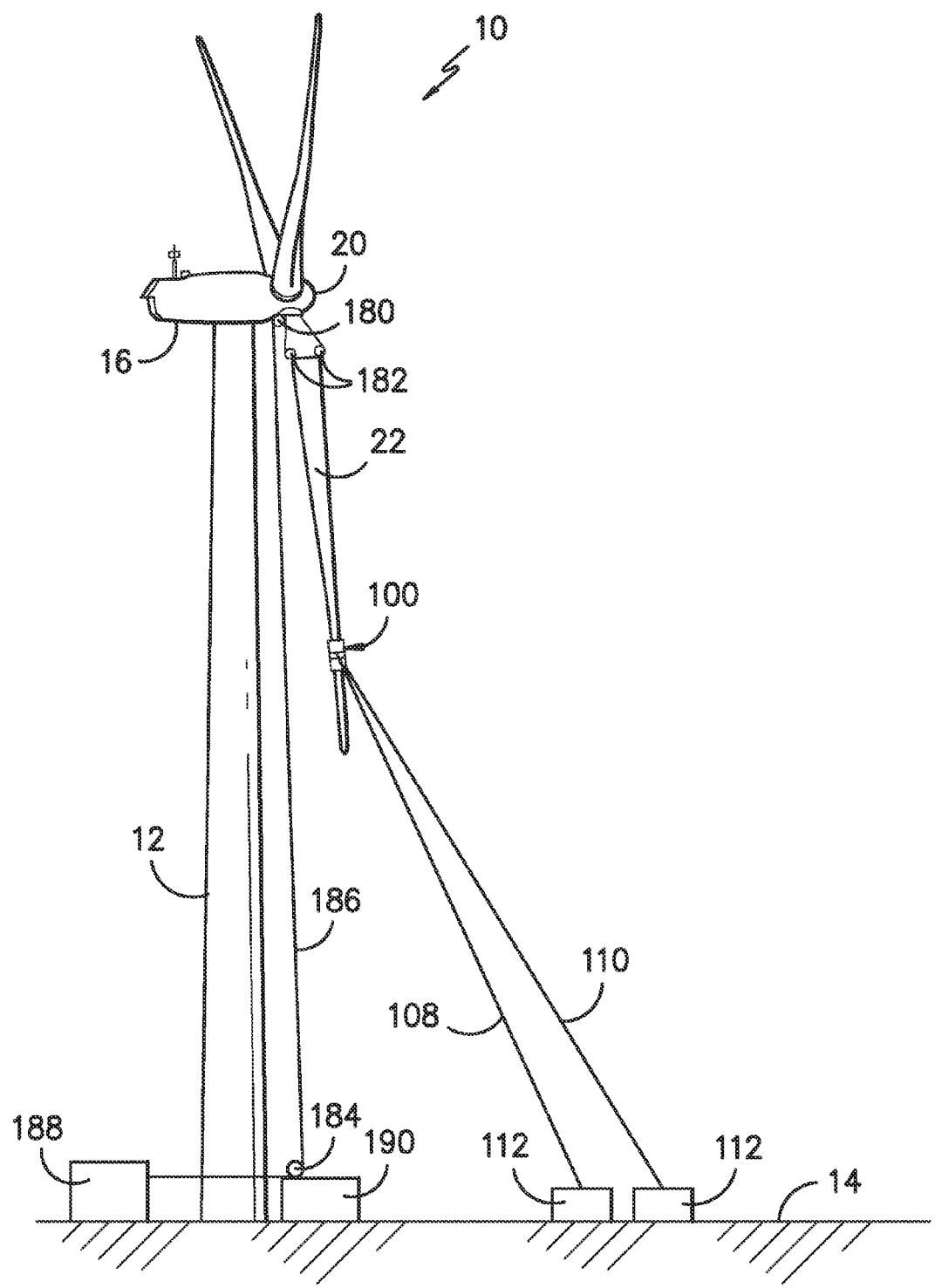
FIG. —14—

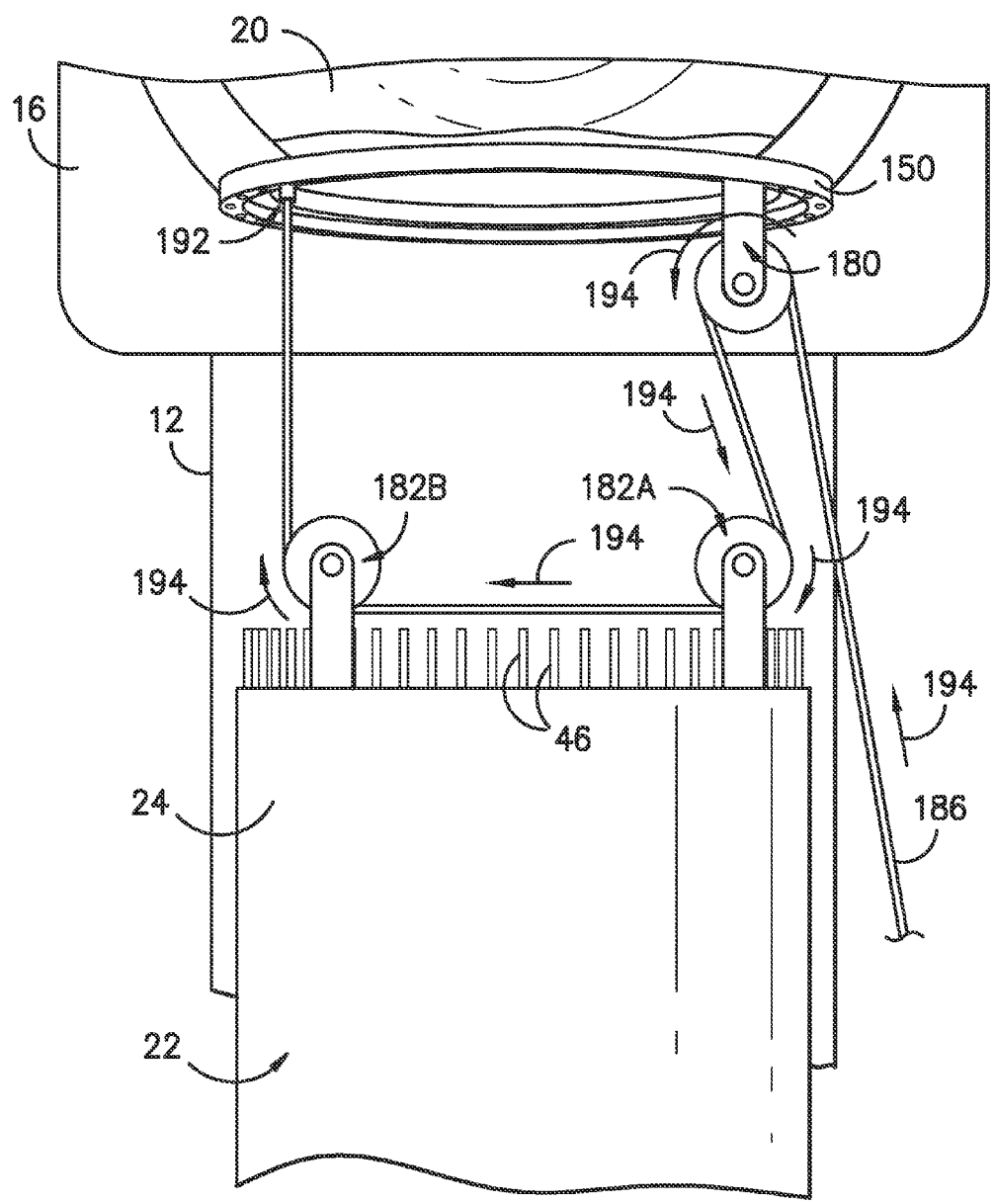
FIG. —15—

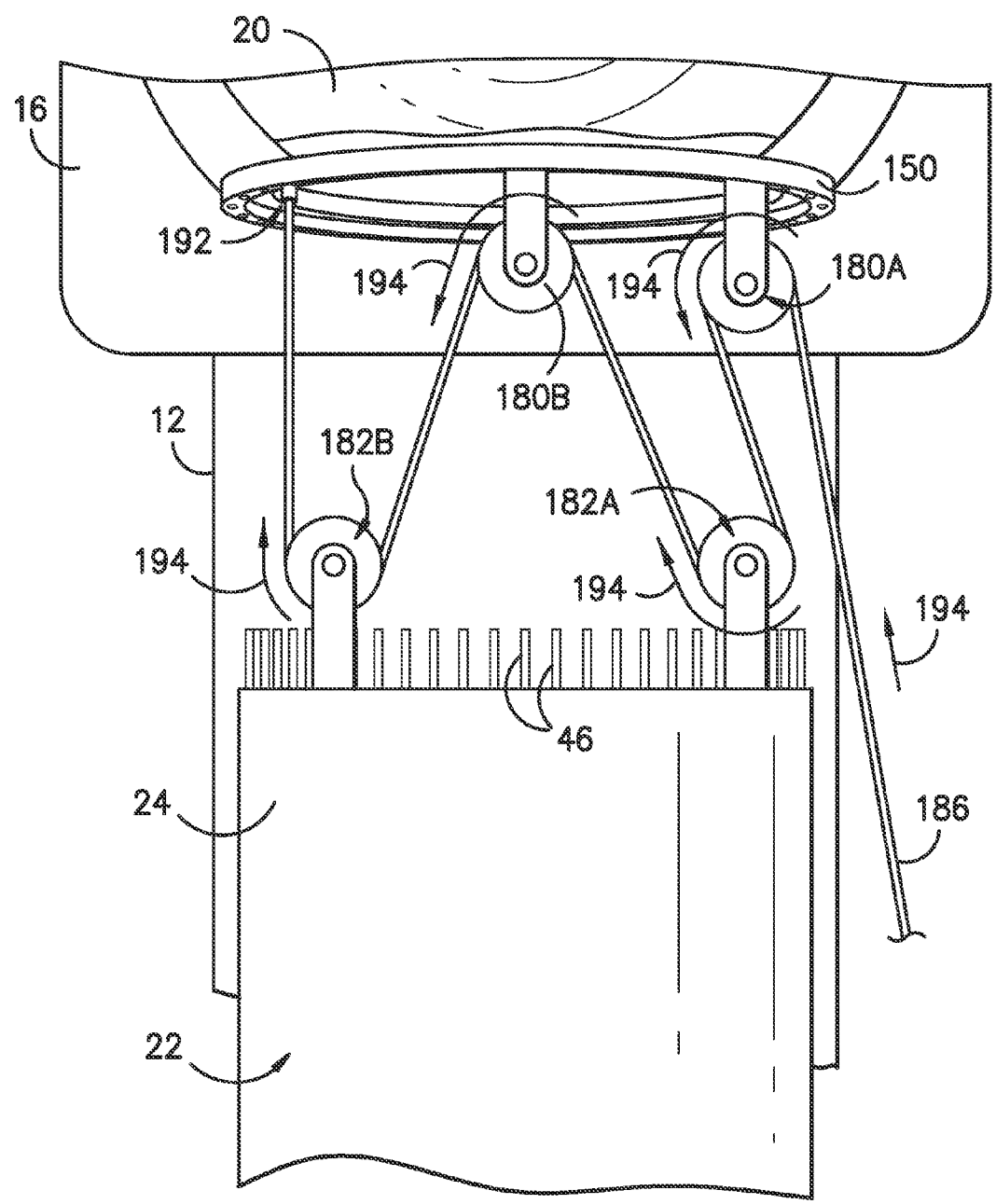
FIG. -16-

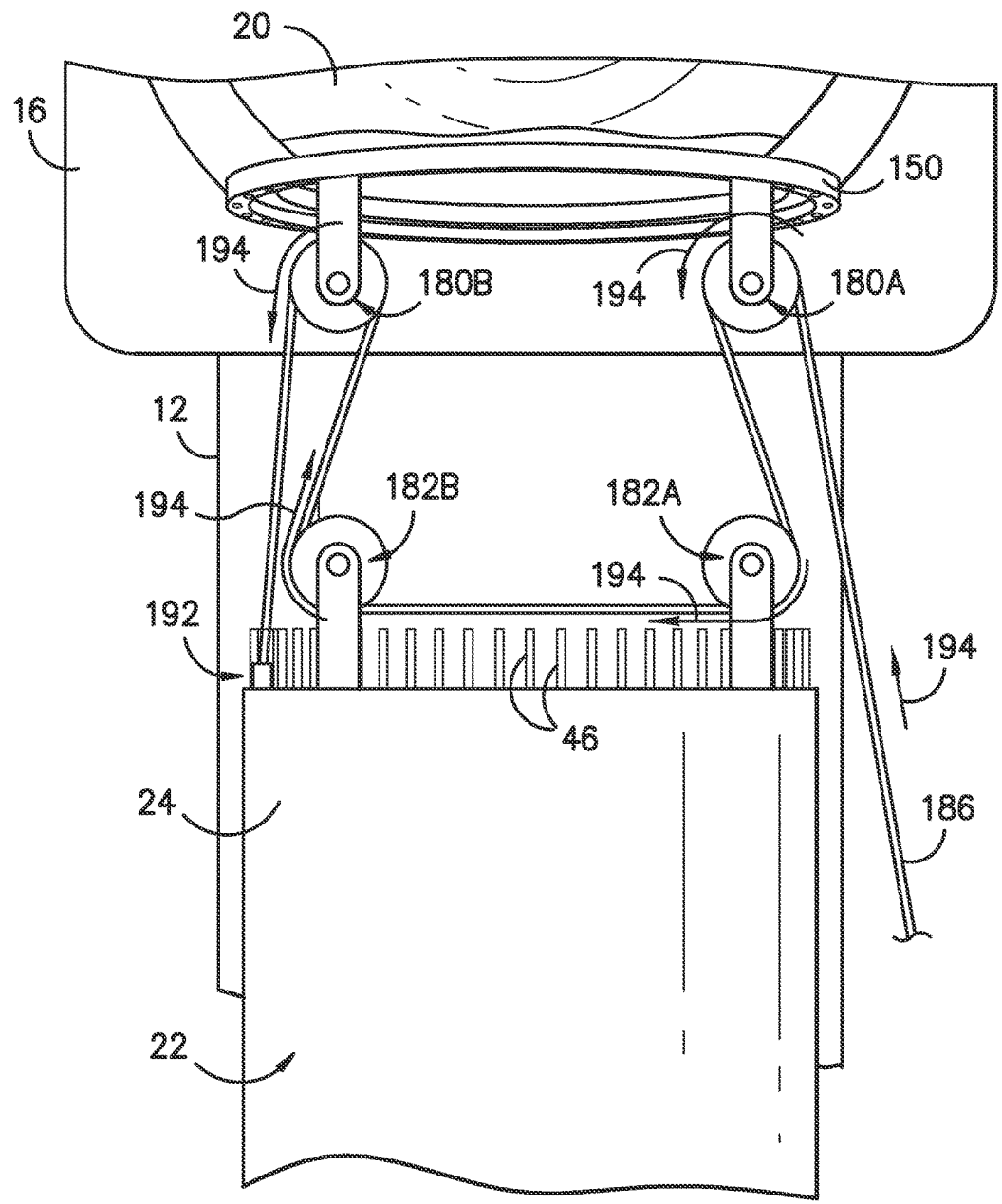
FIG. -17-

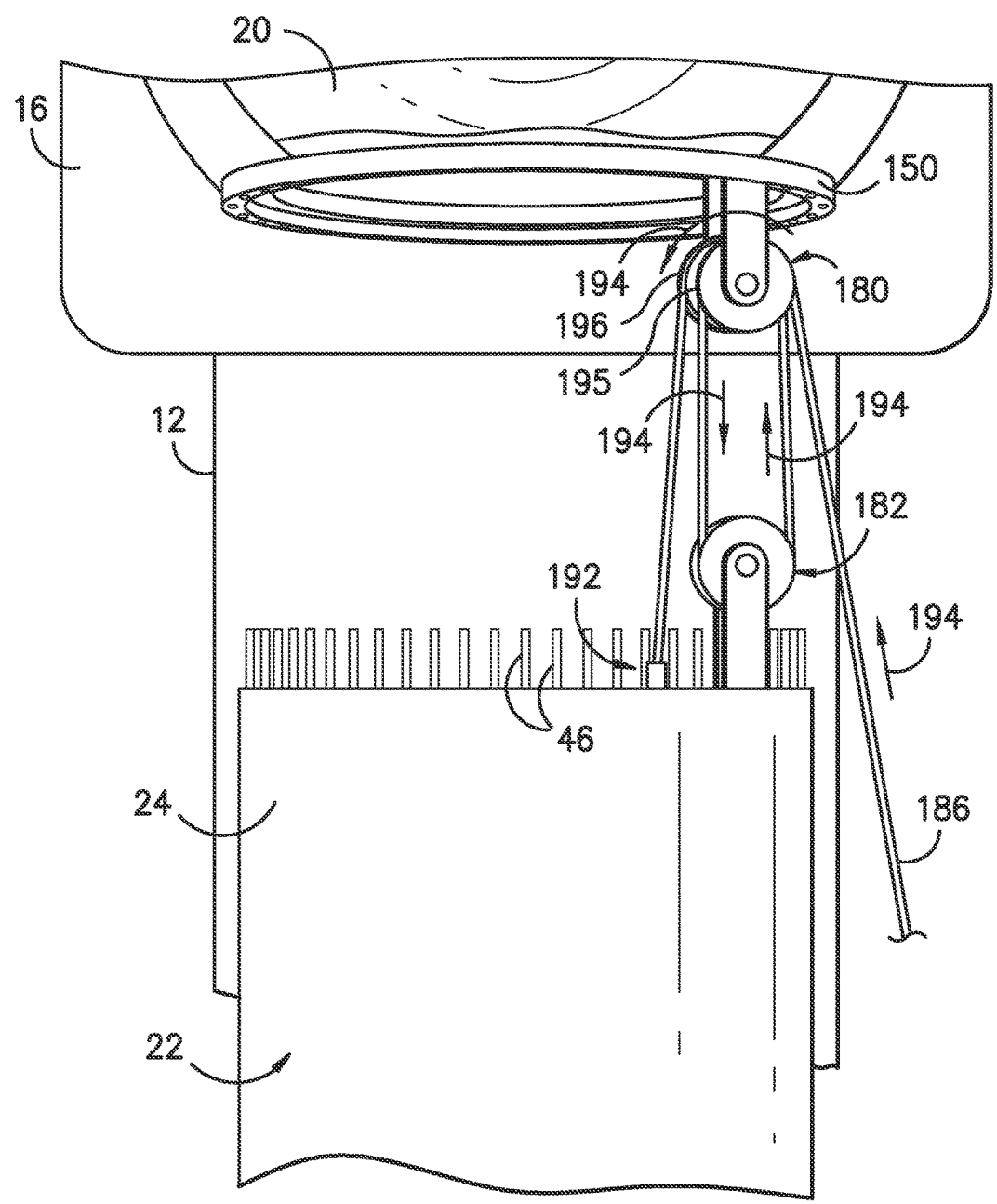
FIG. -18-

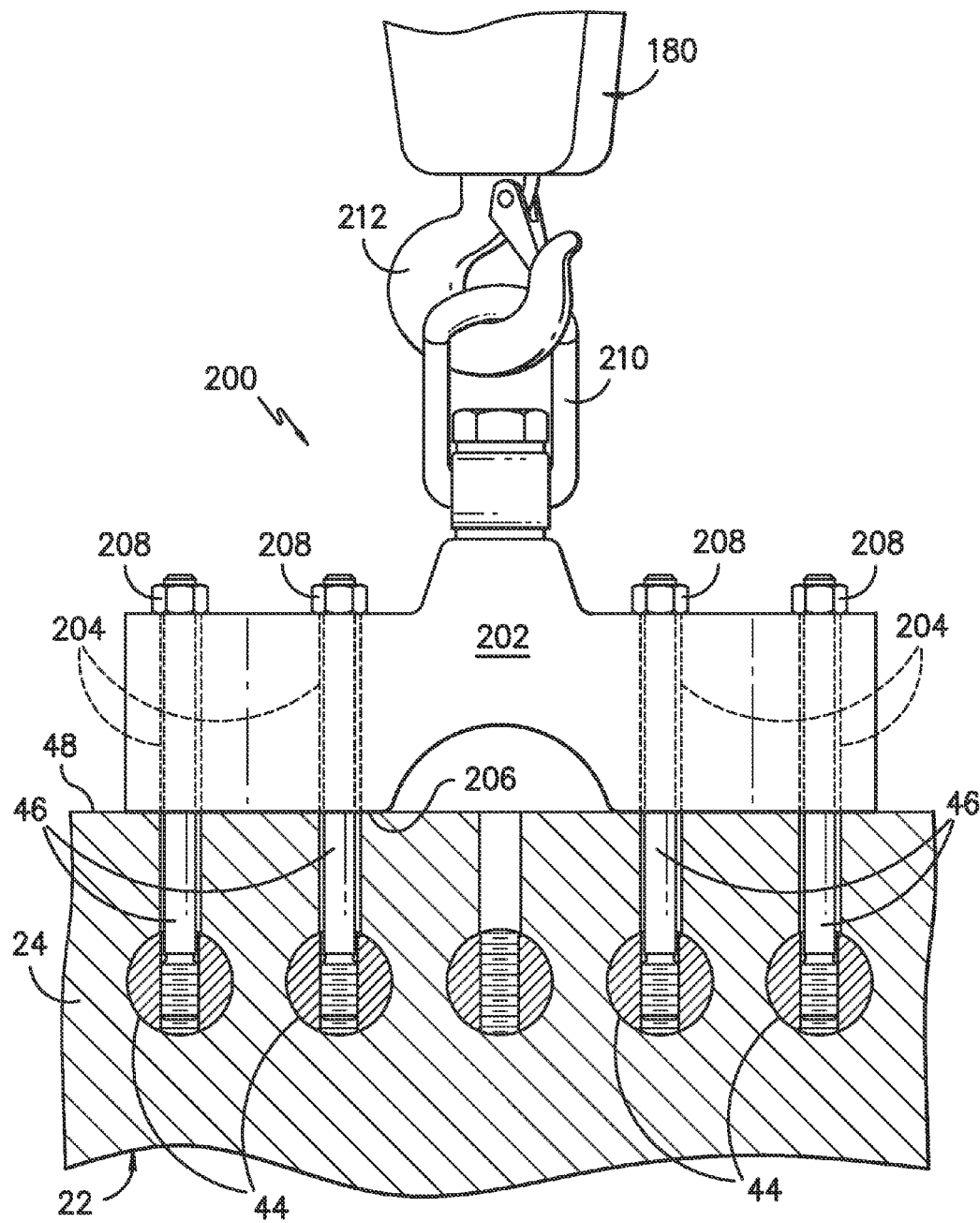
FIG. -19-

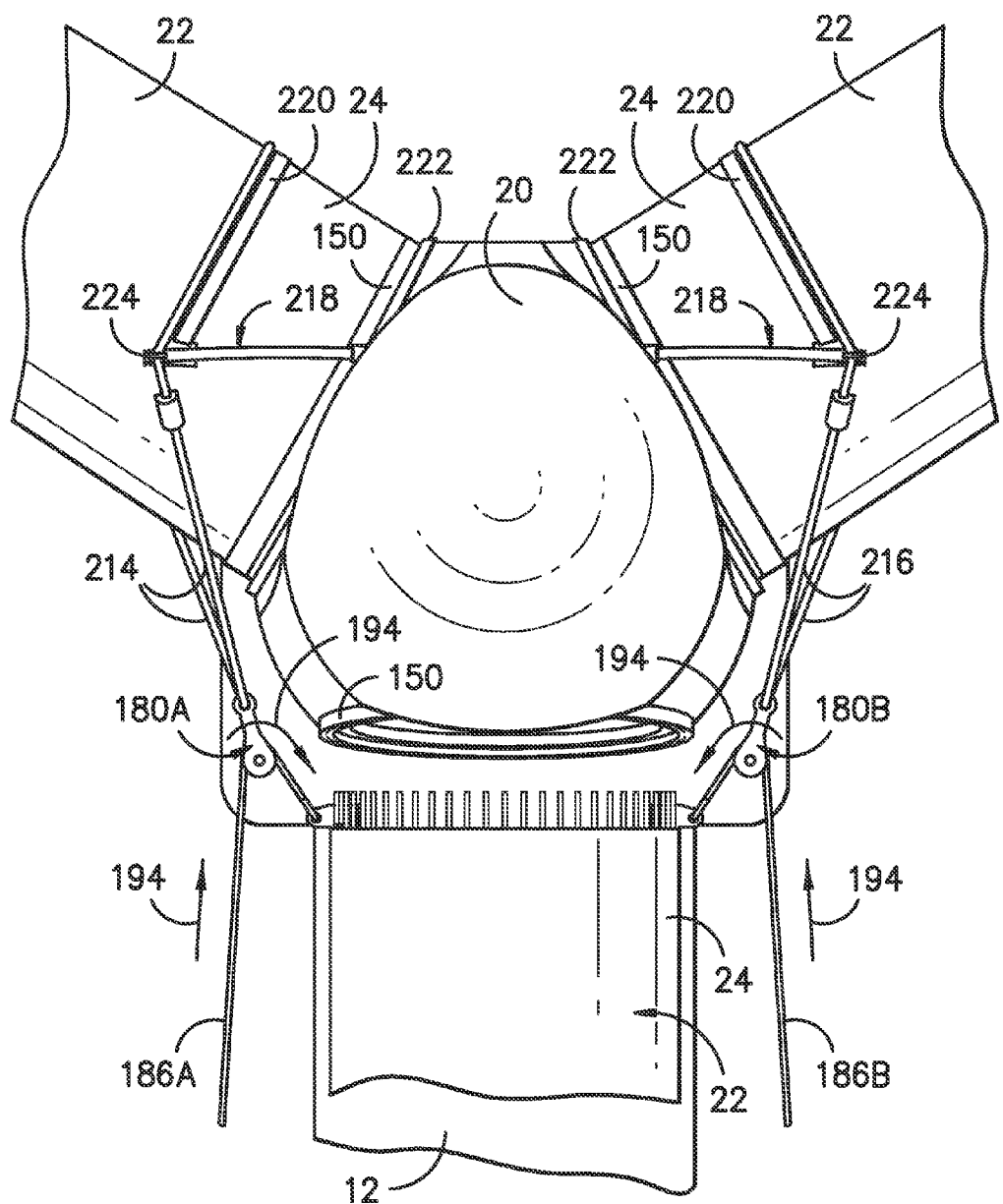
FIG. -20-

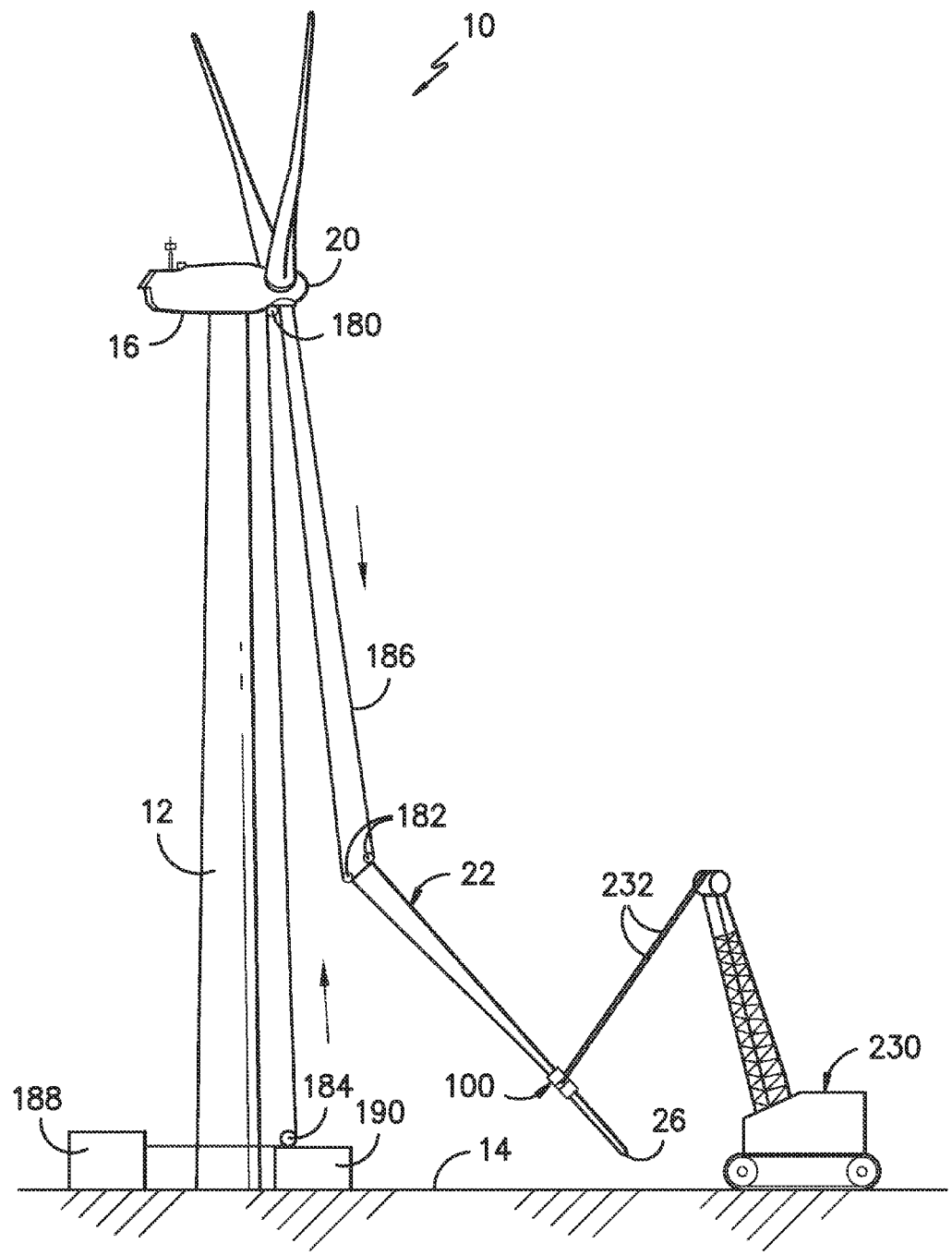
FIG. —21—

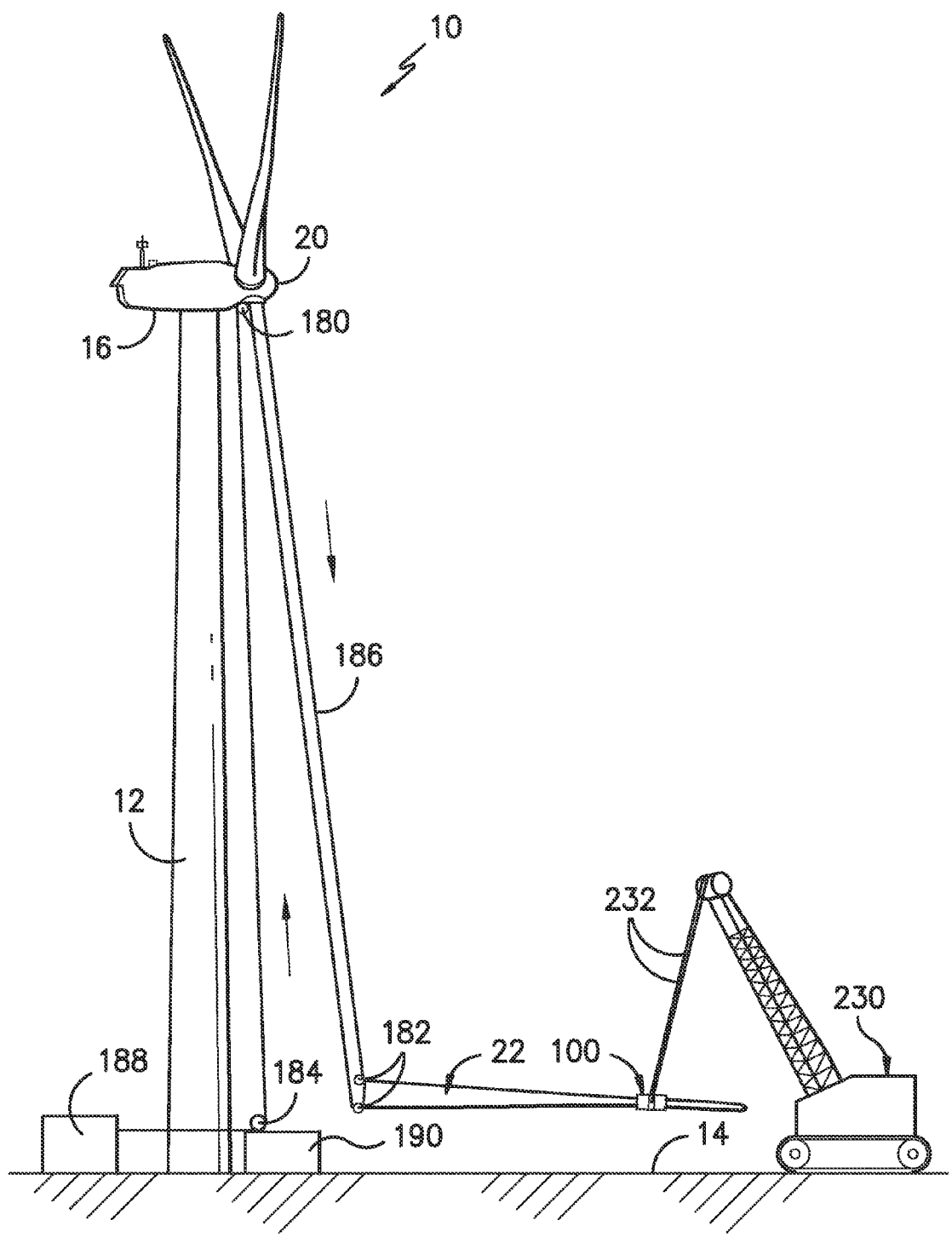
FIG. -22-

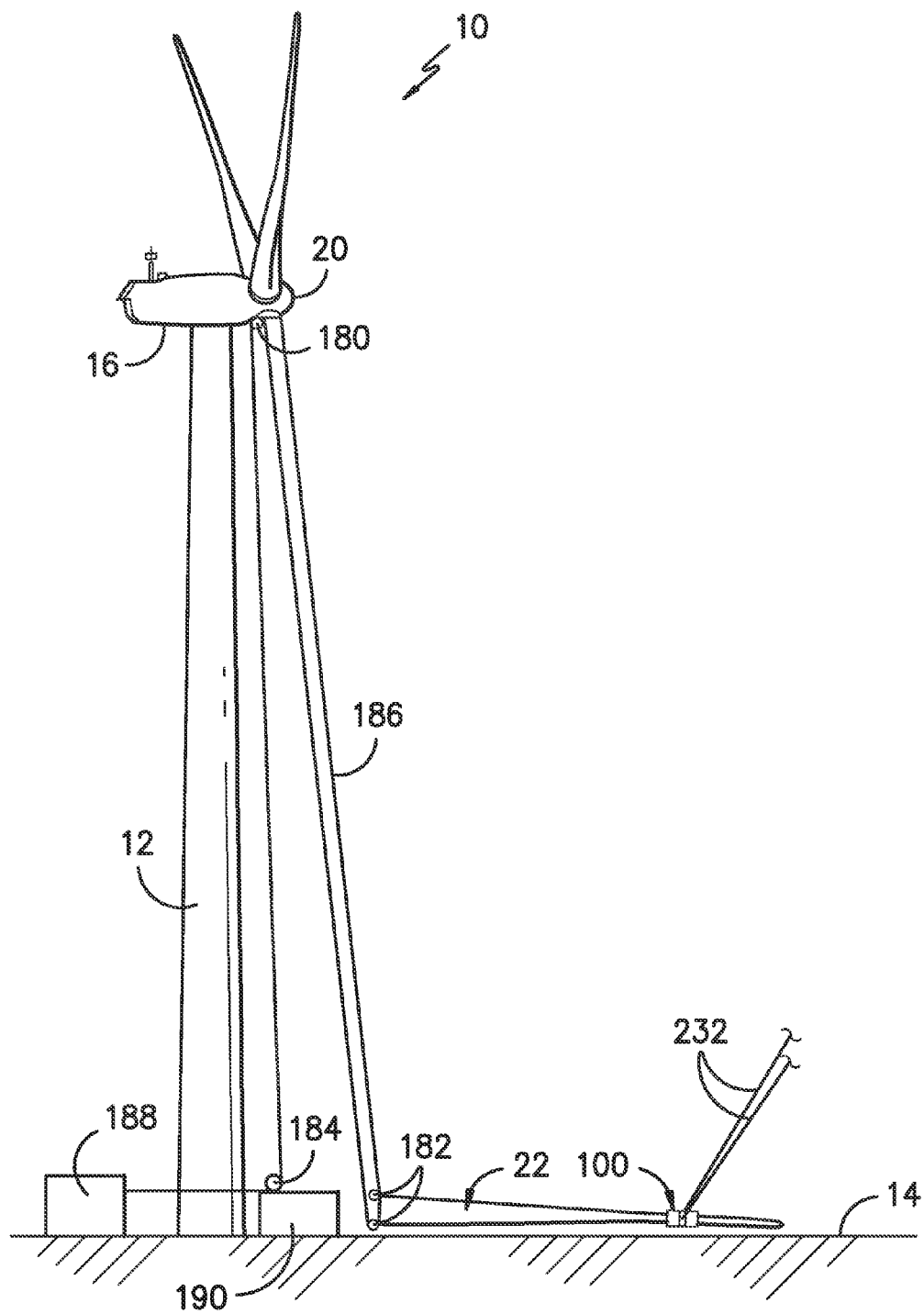
FIG. -23-

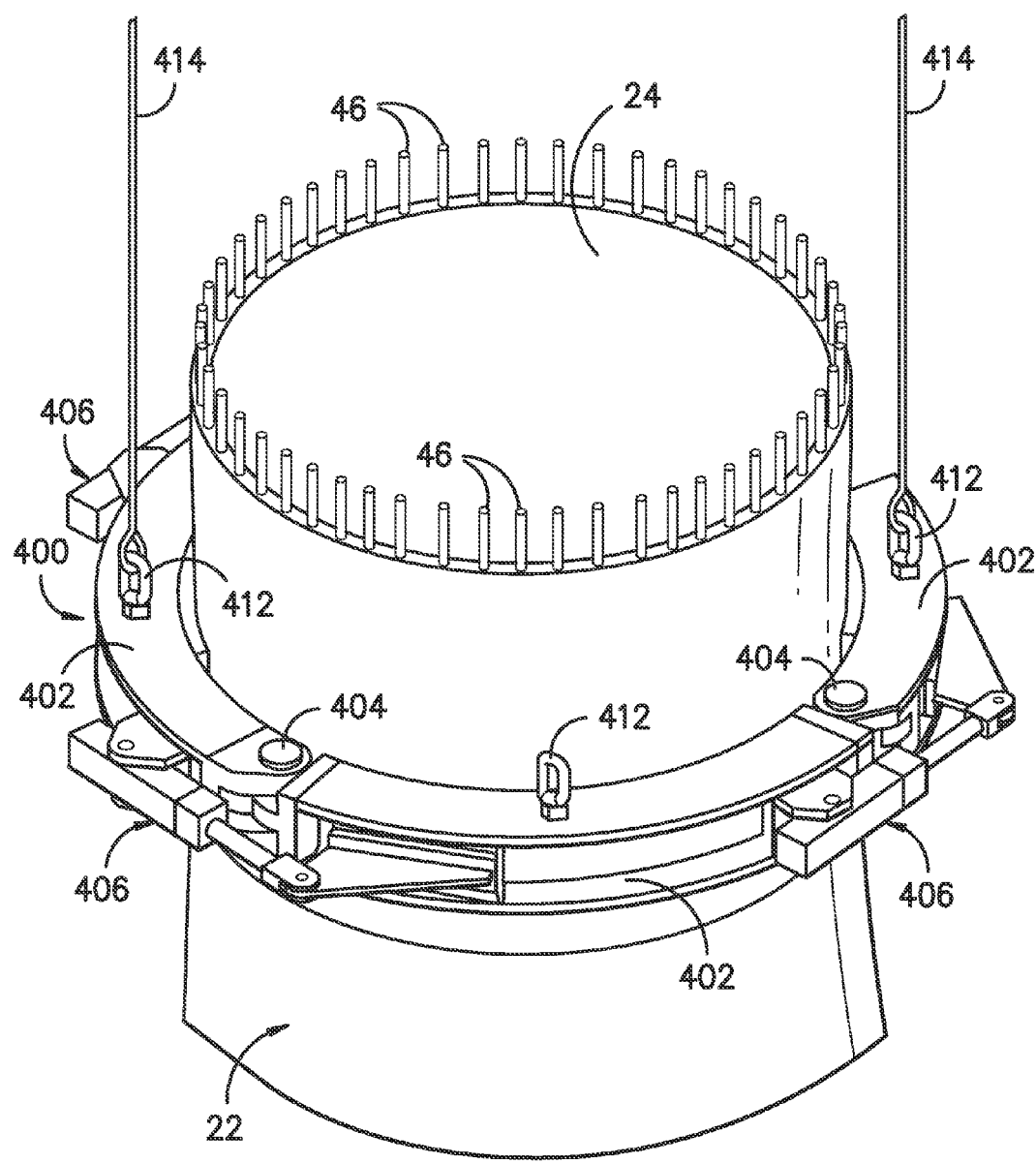
FIG. —24—

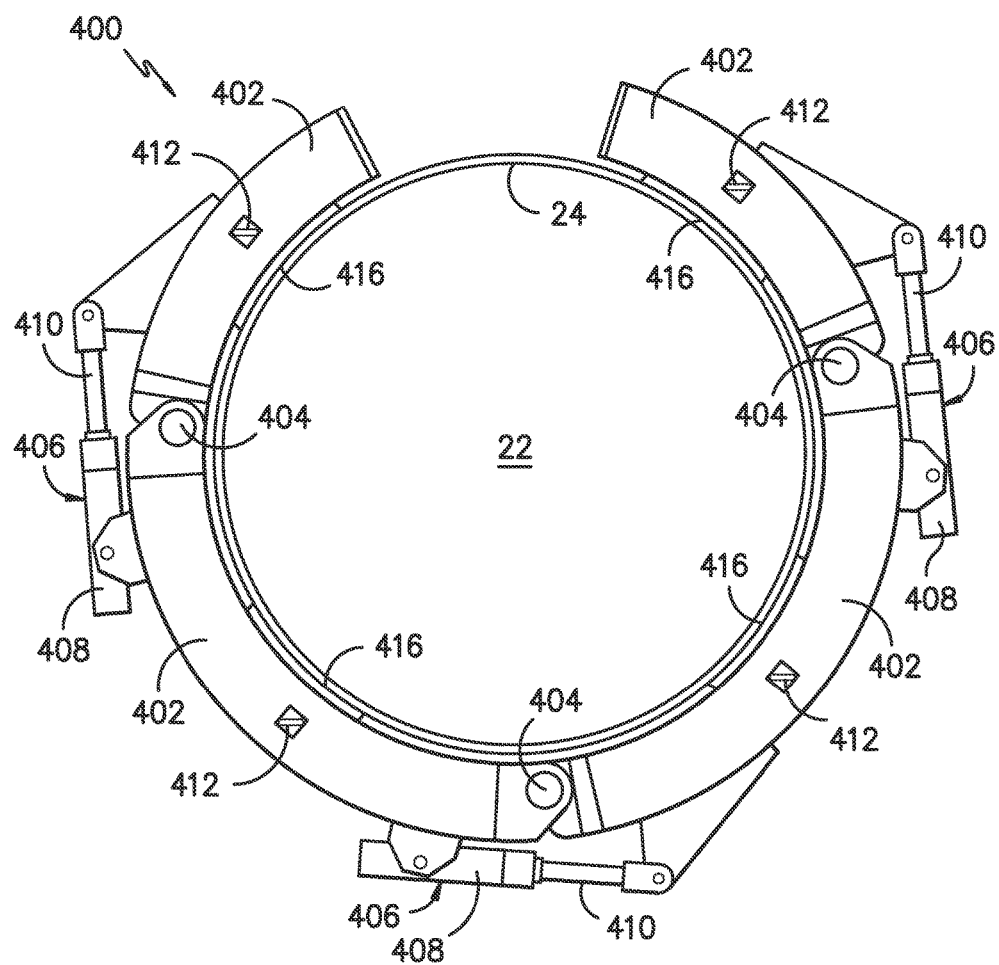
FIG. —25—

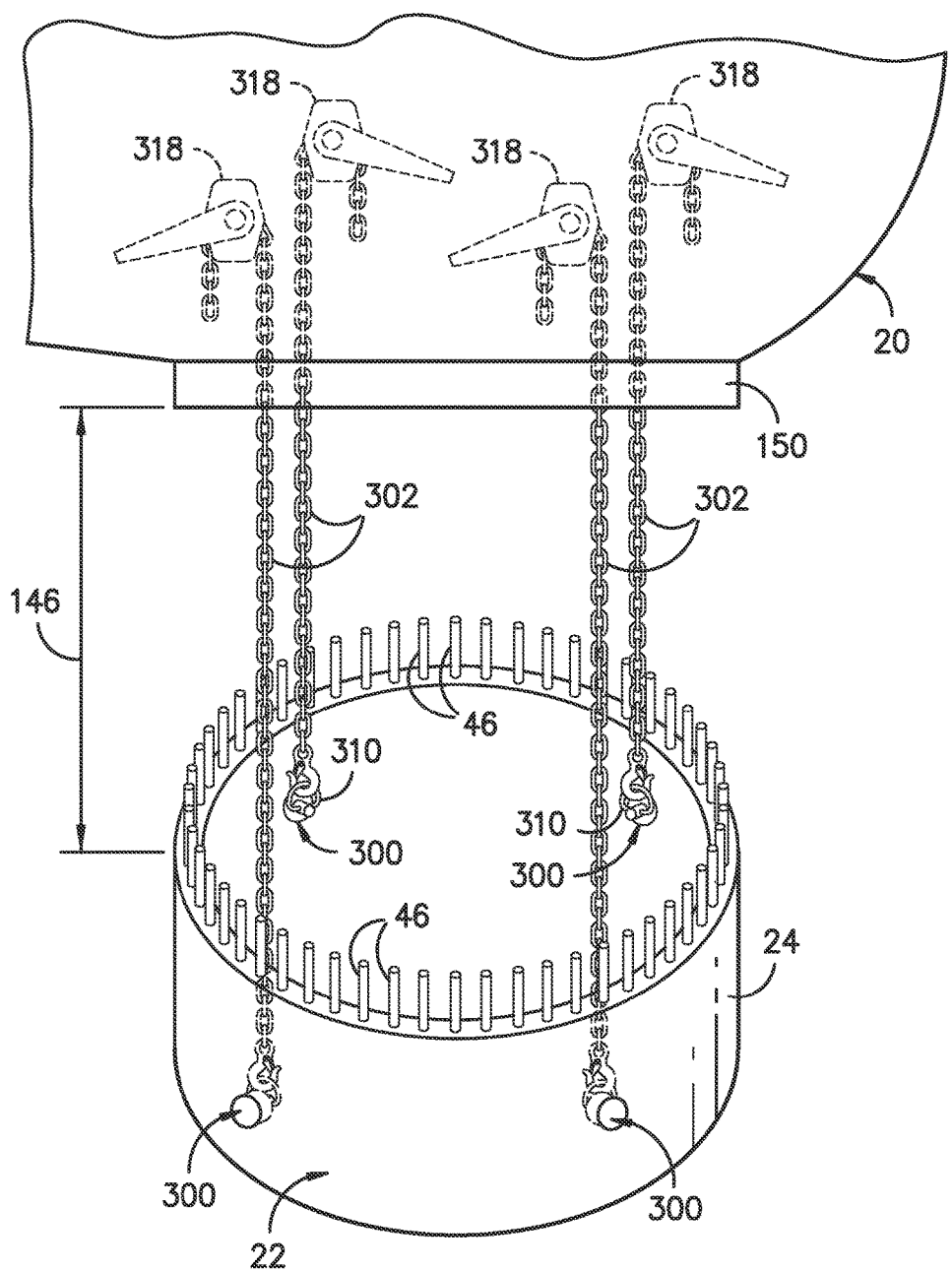
FIG. -26-

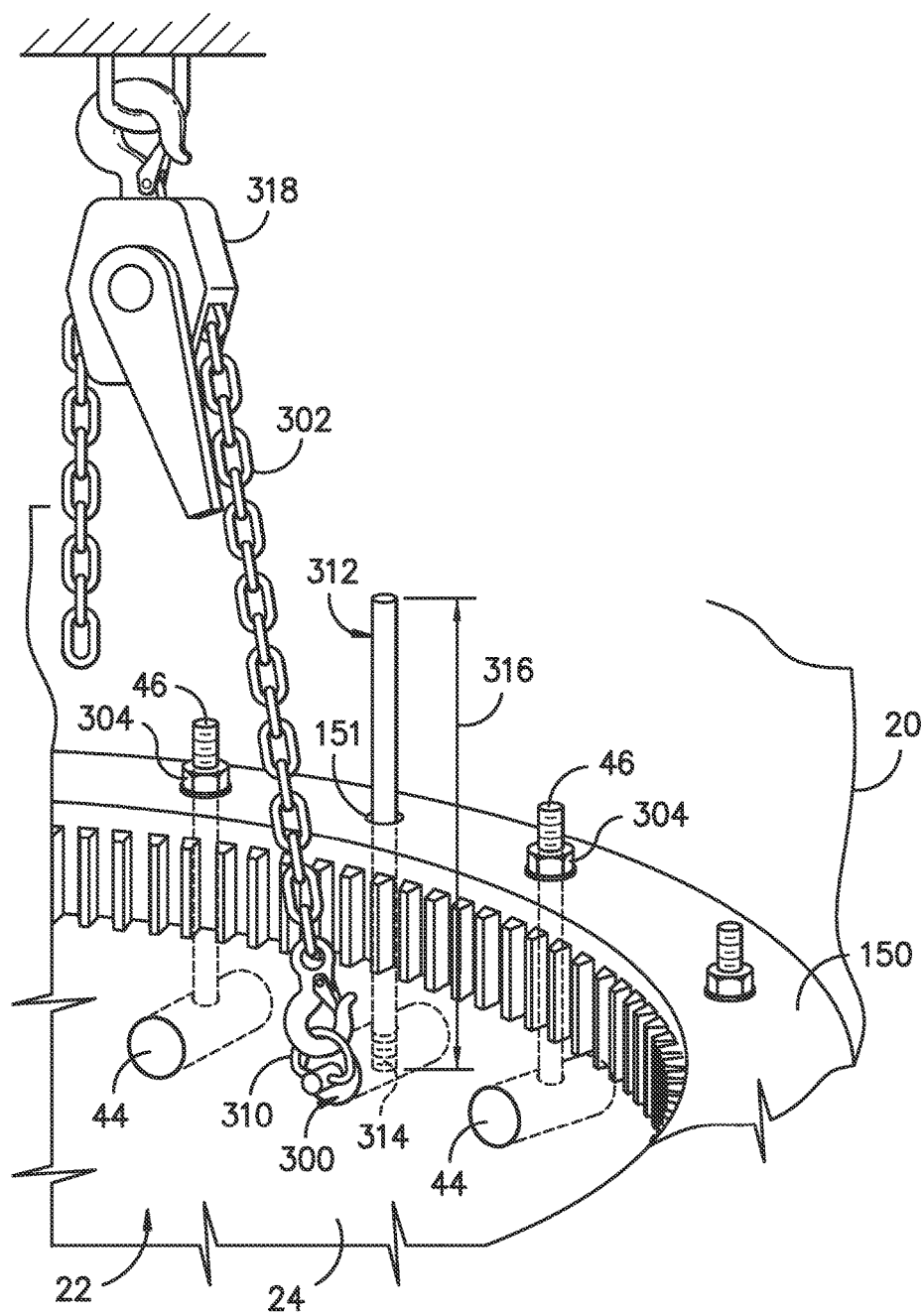
FIG. -27-

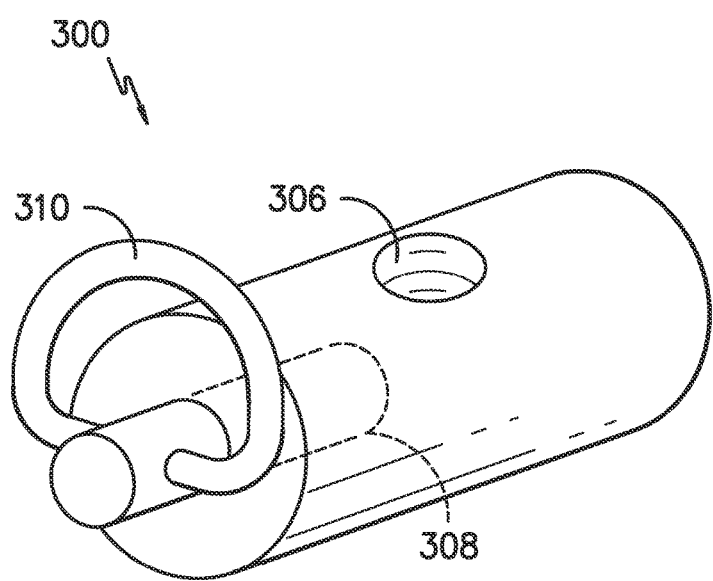
FIG. —28—

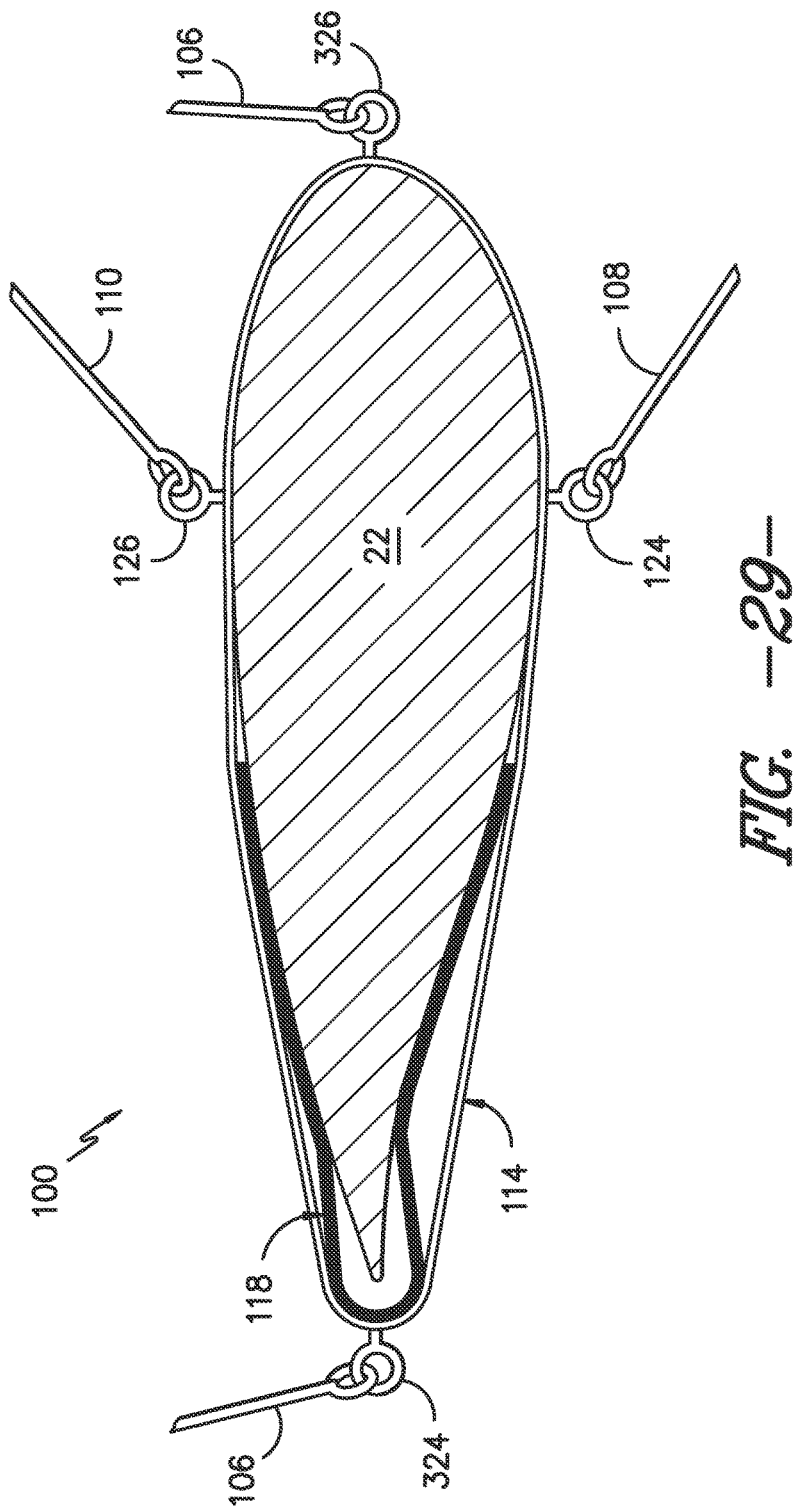

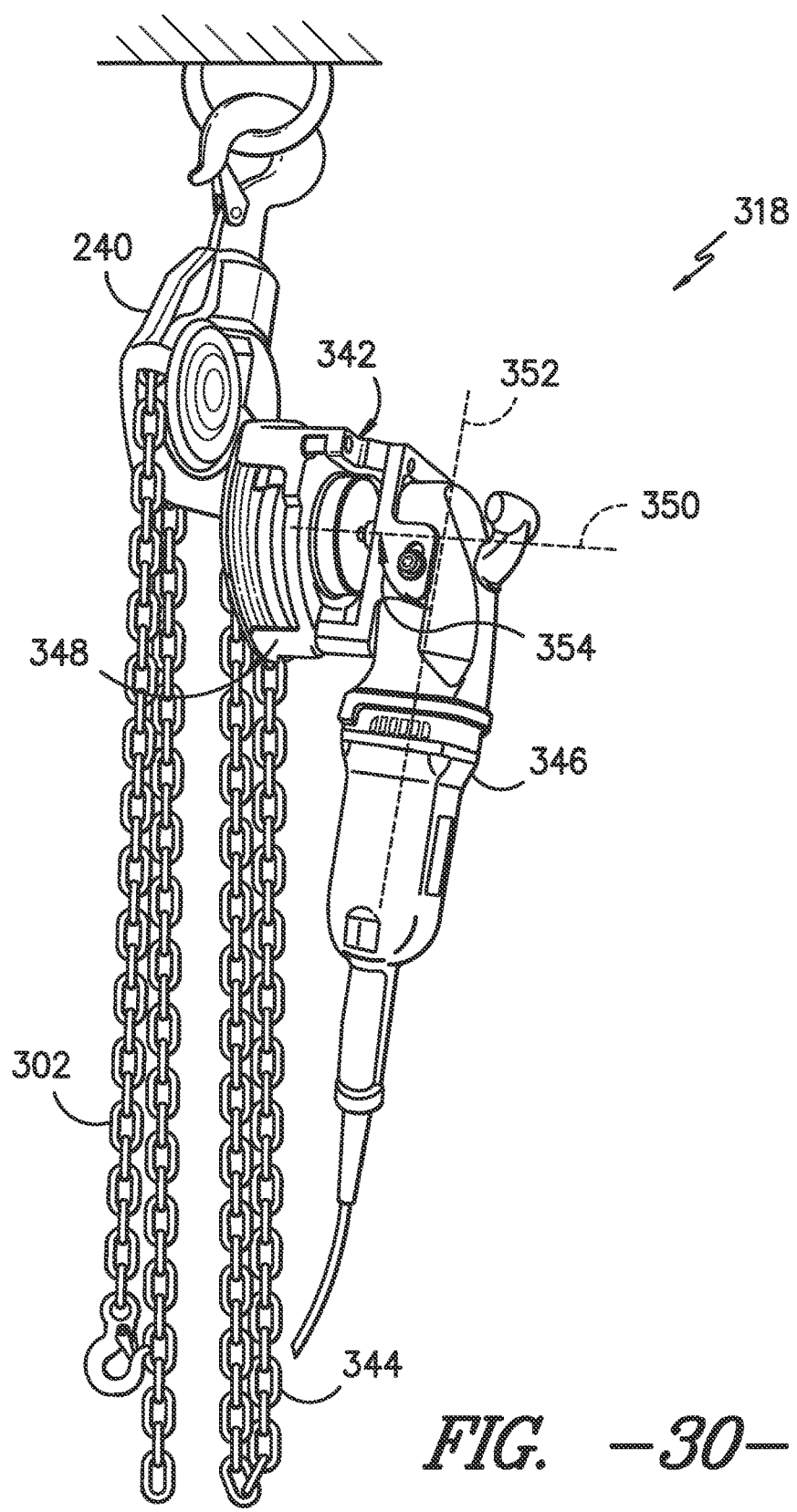
FIG. —30—

METHODS AND SYSTEMS FOR REMOVING AND/OR INSTALLING WIND TURBINE ROTOR BLADES

CROSS-REFERENCE TO RELATED APPLICATIONS

This application claims priority to and is a continuation-in-part of U.S. patent application Ser. No. 14/185,058, filed on Feb. 20, 2014, which is hereby incorporated by reference herein in its entirety for all purposes.

FIELD OF THE INVENTION

The present subject matter relates generally to wind turbines and, more particularly, to improved methods and systems for removing and/or installing the rotor blades of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy. A power converter typically regulates the flow of electrical power between the generator and a grid.

Typically, to initially install a rotor blade onto the wind turbine hub and/or to remove one of the existing rotor blades from the hub, a significantly large crane must be transported to the wind turbine site in order to provide a means for raising and/or lowering the rotor blade relative to the hub. Unfortunately, it is often extremely expensive to both transport the crane to the wind turbine site and operate the crane for the amount of time necessary to install and/or remove the rotor blade(s). As a result, the costs of employing such large cranes currently accounts for a significant portion of the overall costs associated with initial wind turbine installations and rotor blade maintenance operations.

Accordingly, improved methods and related systems for removing and/or installing wind turbine rotor blades that do not require the use of a significantly large crane would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for installing a blade sock onto a rotor blade of a wind turbine. The method may generally include positioning the blade sock adjacent to a blade tip of the rotor blade, wherein the blade sock comprises a sock strap forming a closed-shape. In addition, the method may include moving the blade sock relative to the rotor blade such that the blade tip is received within the closed-shape formed by the sock strap and moving the blade sock spanwise along the rotor blade towards a blade root of the rotor blade until the blade sock is positioned at an intermediate location defined between the blade root and the blade tip, wherein the sock strap is configured to fit tightly around an outer perimeter of the rotor blade at the intermediate location.

In another aspect, the present subject matter is directed to a system for performing blade-related operations on a wind turbine. The system may generally include a rotor blade extending in a spanwise direction between a blade root and a blade tip. The rotor blade may also include a leading edge and a trailing edge extending between a pressure side and a suction side. In addition, the rotor blade may define an intermediate location between the blade root and the blade tip. The system may also include a blade sock configured to be installed onto the rotor blade at the intermediate location. The blade sock may include a sock strap forming a closed-shape, wherein the closed-shape formed by the sock strap is configured to fit tightly around an outer perimeter of the rotor blade at the intermediate location.

In a further aspect, the present subject matter is directed to a method for lowering a rotor blade relative to a hub of a wind turbine, wherein the wind turbine includes a pitch bearing coupled to the hub. The method may generally include installing a plurality of cable translation devices within the hub, wherein each of the plurality of cable translation devices comprises a cable hoist and a motorized drive unit coupled to the cable hoist. The method may also include inserting a plurality of support nuts at least partially through a blade root of the rotor blade, installing a plurality of support cables in operative association with the plurality of cable translation devices, coupling each of the support cables to one of the support nuts and operating the cable translation devices such that the support cables are moved relative the cable translation devices in a manner that causes the rotor blade to be lowered relative to the hub.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a perspective view of one of the rotor blades of the wind turbine shown in FIG. 1;

FIG. 3 illustrates another perspective view of the wind turbine shown in FIG. 1, particularly illustrating a rotor blade to be removed from the wind turbine positioned in a generally vertical orientation relative to a support surface of the wind turbine and a blade sock installed onto the rotor blade;

FIG. 4 illustrates a close-up, partial perspective view of the rotor blade and the blade sock shown in FIG. 3;

FIG. 5 illustrates a cross-sectional view of the rotor blade and blade sock shown in FIG. 4 taken about line 5-5;

FIG. 6 illustrates a top-down view of the cross-section shown in FIG. 5 relative to a support surface of the wind turbine, particularly illustrating sock cables extending from the blade sock to corresponding winches supported on and/or adjacent to the support surface;

FIG. 7 illustrates a similar cross-sectional view to that shown in FIG. 5, particularly illustrating another embodiment of a blade sock in accordance with aspects of the present subject matter;

FIG. 8 illustrates a similar cross-sectional view to that shown in FIG. 5, particularly illustrating a further embodiment of a blade sock in accordance with aspects of the present subject matter;

FIG. 9 illustrates another perspective view of the wind turbine shown in FIG. 3, particularly illustrating the rotor blade to be removed after it has been lowered from the hub by an initial vertical distance;

FIG. 10 illustrates a close-up, partial perspective view of the rotor blade and the hub shown in FIG. 9, particularly illustrating one embodiment of a lowering system including support cables secured to the rotor blade and extending through both a pitch bearing of the wind turbine and corresponding cable translation devices positioned within the hub;

FIG. 11 illustrates a cross-sectional view of the rotor blade and the pitch bearing shown in FIG. 10 prior to the rotor blade being lowered from the hub, particularly illustrating a pair of the support cables and cable translation devices of the lowering system shown in FIG. 10;

FIG. 12 illustrates a top-down view of the pitch bearing shown in FIGS. 10 and 11, particularly illustrating the circumferentially positioning of the cable translation devices around the pitch bearing relative to a tower reference line extending radially from the center of the wind turbine tower through the center of the pitch bearing;

FIG. 13 illustrates a similar cross-sectional view to that shown in FIG. 11, particularly illustrating a variation of the blade lowering system shown in FIG. 11 in which each pair of support cables secured to the rotor blade includes one support cable in operative association with a corresponding cable transition device and another support cable extending through the pitch bearing without being received within a cable translation device;

FIG. 14 illustrates another perspective view of the wind turbine shown in FIG. 9, particularly illustrating a pulley cable coupled between the rotor blade and a corresponding winch via a plurality of pulleys;

FIG. 15 illustrates one example of a pulley arrangement that may be utilized to lower the rotor blade relative to the hub in accordance with aspects of the present subject matter;

FIG. 16 illustrates another example of a pulley arrangement that may be utilized to lower the rotor blade relative to the hub in accordance with aspects of the present subject matter;

FIG. 17 illustrates a further example of a pulley arrangement that may be utilized to lower the rotor blade relative to the hub in accordance with aspects of the present subject matter;

FIG. 18 illustrates yet another example of a pulley arrangement that may be utilized to lower the rotor blade relative to the hub in accordance with aspects of the present subject matter;

FIG. 19 illustrates an example view of one embodiment of a suitable fixture that may be utilized to couple a pulley to the blade root of a rotor blade in accordance with aspects of the present subject matter;

FIG. 20 illustrates an even further example of a pulley arrangement that may be utilized to lower the rotor blade relative to the hub in accordance with aspects of the present subject matter;

FIG. 21 illustrates another perspective view of the wind turbine shown in FIG. 14, particularly illustrating a suitable cable (e.g., a crane cable) being coupled to the blade sock in order to allow the orientation of the rotor blade to be controlled as it is being lowered towards the support surface of the wind turbine;

FIG. 22 illustrates another perspective view of the wind turbine shown in FIG. 21, particularly illustrating the rotor blade being rotated into a generally horizontal position using the cable coupled to the blade sock;

FIG. 23 illustrates another perspective view of the wind turbine shown in FIG. 22, particularly illustrating the rotor blade after it has been lowered to a position on and/or adjacent to the support surface of the wind turbine;

FIG. 24 illustrates a perspective view of a clamp assembly installed onto the blade root of a rotor blade in accordance with aspects of the present subject matter;

FIG. 25 illustrates a top view of the rotor blade and the clamp assembly shown in FIG. 24;

FIG. 26 a close-up, partial perspective view of the rotor blade and the hub shown in FIG. 9, particularly illustrating another embodiment of a lowering system including support cables secured to the rotor blade and corresponding cable translation devices positioned within the hub;

FIG. 27 illustrates a close-up, partial perspective view of the interface between the rotor blade and the pitch bearing shown in FIG. 26 prior to the rotor blade being lowered from the hub, particularly illustrating a support cable coupled between a support nut installed within the blade root and a corresponding cable translation device positioned within the hub;

FIG. 28 illustrates a perspective view of the support nut shown in FIG. 27;

FIG. 29 illustrates a similar cross-sectional view to that shown in FIG. 5, particularly illustrating yet another embodiment of a blade sock in accordance with aspects of the present subject matter; and FIG. 30 illustrates a perspective view of one embodiment of a motorized cable translation device that may be utilized in accordance with aspects of the present subject matter to lower and/or raise a rotor blade relative to the hub.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to various methods for removing rotor blades from and/or installing rotor blades onto a wind turbine. Specifically, as will become apparent from the description provided below, the disclosed methods may allow for the removal and installation of rotor blades without the use of a large, expensive crane, thereby significantly reducing the costs associated with blade removal and/or blade installation.

For example, in several embodiments, to remove a rotor blade from a wind turbine, a blade sock may be initially installed onto the rotor blade at an outboard location on the blade. Additionally, a plurality of support cables may be coupled to the blade root of the rotor blade and may be used to lower the rotor blade relative to the hub a given vertical distance. Thereafter, one or more pulleys may be installed at an up-tower location(s) on the wind turbine to allow a corresponding pulley cable(s) to be coupled between the rotor blade and a winch supported on and/or adjacent to the support surface of the wind turbine. The pulley cable(s) may then be used to lower the rotor blade in the direction of the support surface. Moreover, in several embodiments, one or more cables may be coupled to the blade sock in order to control the orientation of the rotor blade relative to the wind turbine tower and/or relative to the support surface as the blade is being lowered. For instance, the tension in the cable(s) may be controlled in order to prevent contact between the rotor blade and the tower and/or to rotate the rotor blade into a generally horizontal position relative to the support surface. The pulley cable(s), in combination with the cable(s) secured to the blade sock, may then be used to lower the rotor blade onto and/or adjacent to the support surface. As will be described below, such method steps may also, in several embodiments, be reversed to allow for the installation of a rotor blade onto a wind turbine.

It should be appreciated that, in addition to the disclosed methods, the present subject matter is also directed to a system for removing rotor blades from and/or installing rotor blades onto a wind turbine. Specifically, the system may generally include any combination of the various components described herein as being used during the performance of any of the disclosed methods.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 19 may include more or less than three rotor blades 22. Each rotor blade 22 may be spaced about the hub 20 to facilitate rotating the rotor 19 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIG. 2, a perspective view of one of the rotor blades 22 shown in FIG. 1 is illustrated in accordance with aspects of the present subject matter. As shown, the rotor blade 22 includes a blade root 24 configured for mounting the rotor blade 22 to the hub 20 of a wind turbine 10 (FIG. 1) and a blade tip 26 disposed opposite the blade root 24. A body 28 of the rotor blade 22 may extend lengthwise between the blade root 24 and the blade tip 26 and may generally serve as the outer shell of the rotor blade 22. As is generally understood, the body 28 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 28 may generally include a pressure side 30 and a suction side 32 extending between a leading edge 34 and a trailing edge 36. Additionally, the rotor blade 22 may have a span 38 defining the total length of the body 28 between the blade root 24 and the blade tip 26 and a chord 40 defining the total length of the body 28 between the leading edge 34 and the trailing edge 36. As is generally understood, the chord 40 may vary in length with respect to the span 38 as the body 29 extends from the blade root 24 to the blade tip 26.

Moreover, as shown in FIG. 2, the rotor blade 22 may also include a plurality of T-bolts or root attachment assemblies 42 for coupling the blade root 22 to the hub 20 of the wind turbine 10. In general, each root attachment assembly 42 may include a barrel nut 44 mounted within a portion of the blade root 24 and a root bolt 46 coupled to and extending from the barrel nut 44 so as to project outwardly from a root end 48 of the blade root 24. By projecting outwardly from the root end 48, the root bolts 46 may generally be used to couple the blade root 24 to the hub 20 via a pitch bearing 150 (FIG. 10) of the wind turbine 10. For example, the pitch bearing 150 may define a plurality of bolt holes 151 (FIGS. 11-12) configured to receive the root bolts 48. Additionally, as will be described below, a portion of such root bolts 46 may also be utilized when the rotor blade 22 is being removed from and/or installed onto the hub 20.

Various embodiments of methods for removing a rotor blade 22 from a wind turbine 10, including various system components that may be used in performing such methods, will now be described with reference to FIGS. 3-30. It should be appreciated that, although the methods will generally be described with reference to removing a rotor blade 22 from a wind turbine 10, the various method steps and system components disclosed herein may similarly be used to install a rotor blade 22 onto a wind turbine 10 by simply reversing the order in which the method is performed. It should also be appreciated that, although the methods will be described herein as being performed in a particular order, the methods may generally be performed in any suitable order that is consistent with the disclosure provided herein.

Referring particularly to FIG. 3, the rotor blade 22 to be removed may be initially rotated to a vertically downward position (e.g., a 6 o'clock position) such that the blade 22 has a generally vertical orientation relative to the support surface 14 of the wind turbine 10. For example, as shown in FIG. 3, the rotor blade 22 is extending vertically downward from the hub 20 such that the blade tip 26 is pointing towards the support surface 14. It should be appreciated that, due to a tilt angle and/or cone angle of the wind turbine 10, the rotor blade 22 may be angled slightly away from the tower 12 when moved to the vertically downward position.

In several embodiments, once the rotor blade 22 is rotated to the vertically downward position, a blade sock 100 may be installed onto the blade 22 at an intermediate location 102 defined between the blade root 24 and the blade tip 26. In one embodiment, the intermediate location 102 may correspond to a location defined along an outboard section of the rotor blade 22, such as at a location spaced apart from the blade root 24 by a distance 104 that is greater that about 50% of the blade span 38 (FIG. 2). For example, the distance 104 may range from about 50% of the span 38 to about 95% of the span 38, such as from about 65% of the span 38 to about 95% of the span 38 or from about 75% of the span 38 to about 90% of the span 38 and any other subranges therebetween, As shown in FIG. 3, to install the blade sock 100 onto the rotor blade 22, one or more lift cables 106 may be secured to the blade sock 100 and may extend upward to an up-tower location, such as at a location on and/or within the hub 20 or the nacelle 16. For instance, in one embodiment, the lift cable(s) 106 may extend upward from the blade sock 102 to personnel located within and/or on top of the hub 20 or the nacelle 16. Regardless, the lift cable(s) 106 may be used to lift the blade sock 100 vertically upwards relative to the support surface 14 to allow the sock 100 to be installed around the rotor blade 22 at the intermediate location 102. For instance, as will be described below, the blade sock 100 may define a closed shape configured to extend around the entire outer perimeter of the rotor blade 22. Thus, when lifting the blade sock 100 via the lift cable(s) 102, the sock 100 may be carefully aligned with the rotor blade 22 such that the blade tip 26 is received within the sock 100.

Additionally, one or more sock cables 108, 110 may also be coupled to the blade sock 100 and may extend downward to a location adjacent to the support surface 14. For instance, in the illustrated embodiment, the system includes a first sock cable 108 and a second sock cable 110 coupled between the blade sock 100 and corresponding winches 112 disposed on and/or adjacent to the support surface 14. The sock cables 108, 110 may, for example, be utilized to assist in aligning the blade sock 100 with the rotor blade 22 as the sock 100 is being lifted up onto the blade 22 via the lift cables 106. In addition, as will be described below, the sock cable(s) 108, 110 may also be used as a means for tightening the blade sock 100 around the rotor blade 22 at the intermediate location 102 and/or for applying a force through the blade sock 100 in order to adjust and/or control the orientation of the rotor blade 22 as it is being lowered towards to the support surface 14.

Referring now to FIGS. 4-6, differing views of one embodiment of the blade sock 100 described above are illustrated in accordance with aspects of the present subject matter. Specifically, FIG. 4 illustrates a close-up, perspective view of the blade sock 100 installed onto the rotor blade 22 at the intermediate location 102 with the lift cables 106 being removed and FIG. 5 illustrates a cross-sectional view of the blade sock 100 shown in FIG. 4 taken about line 5-5. Additionally, FIG. 6 illustrates top-down view of the cross-section shown in FIG. 5, particularly illustrating the sock cables 108, 110 extending from the blade sock 100 to corresponding winches 112 disposed on and/or adjacent to the support surface 14.

As particularly shown in FIGS. 4 and 5, the blade sock 100 may include a sock strap 114 generally defining a closed shape configured to extend around the outer perimeter of the rotor blade 22. In addition, the blade sock 100 may include one or more edge supports 116, 118 positioned between the sock strap 114 and the rotor blade 22. For example, as shown in the illustrated embodiment, the blade sock 100 includes both a leading edge support 116 positioned between the sock strap 114 and the rotor blade 22 around the location of the leading edge 34 of the blade 22 and a trailing edge support 118 positioned between the sock strap 114 and the rotor blade 22 around the location of the trailing edge 36 of the blade 22.

In general, the sock strap 114 may be configured to be tightened around the outer perimeter of the rotor blade 22 in order to secure the blade sock 100 to the blade 22 at the intermediate location 102. In several embodiments, the sock strap 114 may be configured to be self-tightening. For example, as shown in FIG. 5, the sock strap 114 may extend lengthwise between a first end 120 and a second end 122. In addition, the sock strap 114 may include suitable coupling mechanisms (e.g., mount rings or hooks or any other suitable coupling device) positioned at the ends 120, 122 of the strap 114 for coupling each end 120, 122 to one of the sock cables 108, 110. Specifically, as shown in FIG. 5, a first mount ring 124 may be secured to the first end 120 of the sock strap 114 and a second mount ring 126 may be secured to the second end 122 of the sock strap 114. In such an embodiment, the sock strap 114 may be configured to be looped around the outer perimeter of the rotor blade 22 in a partially overlapping manner such that the first mount ring 124 is disposed on one side of the rotor blade 22 (e.g., the pressure side 30) and the second mount ring 126 is disposed on the opposite side of the rotor blade 22 (e.g., the suction side 32). As such, when the sock cables 108, 110 are coupled to the mount rings 124, 126 and subsequently pulled or otherwise tensioned (e.g., via the winches 112) so as to apply a tightening force at each end 120, 122 of the sock strap 114 (indicated by arrows 128 in FIG. 5), the strap 114 may be configured to tighten around the outer perimeter of the rotor blade 22, thereby securing the blade sock 100 to the rotor blade 22.

It should be appreciated that, in alternative embodiments, the sock strap 114 may have any other suitable configuration that allows it to be tightened around the rotor blade 22 using the sock cables 108, 110. For instance, instead of being looped around the rotor blade 22 in the partially overlapping manner shown in FIG. 5, the sock strap 114 may be configured similar to a choker-type lifting sling. An example of such a configuration is illustrated, for example, in FIG. 7. As shown in FIG. 7, the sock strap 114 may be configured to be looped around the rotor blade 22 once, with the first end 120 of the sock strap 114 being received through the mount ring 126 secured to the second end 122 of the strap 114. In such an embodiment, by coupling one of the sock cables (e.g., the first sock cable 108) to the first end 120 of the strap 114, the sock cable 108 may be used to apply a tightening force through the sock strap (as indicated by arrow 128) in order to tighten the sock strap 114 around the rotor blade 22. Additionally, as shown in FIG. 20, to allow the other sock cable (e.g., the second sock cable 11) to be coupled to the blade sock 100, a suitable coupling device 125 may be secured to the sock strap 114 at a location between its first and second ends 120, 112 (e.g., at a midpoint between the ends 120, 122).

Alternatively, FIG. 8 illustrates yet another example of a choker-type configuration that may be utilized to allow the sock strap 114 to be self-tightening. As shown, the sock strap is formed from two separate strap portions 114A, 114B. Specifically, the first strap portion 114A may be configured to extend partially around the outer perimeter of the rotor blade 22 between first and second mount rings 124, 126. In addition, the second strap portion 114B may be configured to extend around the remainder of the outer perimeter of the rotor blade 22. In such an embodiment, each end of the second strap portion 114B may be received through one of the mount rings 124, 126 of the first strap portion 114A and coupled to one of the sock cables 108, 110. Thus, each sock cable 108, 110 may be used to apply a tightening force (as indicated by arrows 128) through the first and second strap portions 114A, 114B that allows the sock strap to be tightened around the rotor blade 22.

It should be appreciated that the sock strap 114 (including strap portions 114A, 114B) may generally be formed from any suitable material(s) that allow the strap 114 to function as described herein. For instance, in several embodiments, the sock strap 114 may be formed from a relative strong and/or durable material, such as nylon, Kevlar or any other suitable material typically utilized to form lifting straps and/or slings.

Additionally, in alternative embodiments, the sock strap 114 may be configured to self-tighten around the rotor blade 22 due to its fixed shape and/or size. For example, FIG. 29 illustrates an embodiment in which the sock strap 114 forms a continuous, closed loop defining a fixed length around its perimeter. In such an embodiment, the length of strap material used to form the closed loop defined by the sock strap 114 may be selected so as define a maximum internal area generally corresponding to the cross-sectional area of the rotor blade 22 at the desired intermediate location 102. For example, as is generally understood, the cross-sectional area of the rotor blade 22 generally increases with movements along the blade's span 38 from the blade tip 26 towards the blade root 24. Thus, by carefully sizing the sock strap 114, the strap 114 may be configured to be moved spanwise along the rotor blade 22 from the blade tip 26 towards the blade root 24 until the sock strap 114 tightens around the outer perimeter of the rotor blade 22 (e.g., at the desired intermediate location 102), at which point the blade sock 100 may no longer be moved towards the blade root 26 due to the increased cross-sectional area of the rotor blade 22.

Referring still to FIG. 29, as indicated above, the blade sock 100 may also include mount rings 124, 126 for coupling the sock cables 108, 110 to the blade sock 100. In such instance, the sock cables 108, 110 may be utilized primarily to apply a force through the blade sock 100 in order to adjust and/or control the orientation of the rotor blade 22 as it is being lowered towards to the support surface 14. Moreover, as shown in FIG. 29, in addition to the mount rings 124, 126 associated with the sock cables 108, 110, the black sock 100 may also include one or more mount rings 324, 326 for coupling the lift cables 106 to the sock 100. As indicated above, the lift cables 106 may, in certain embodiments, be utilized for installing the blade sock 100 onto the rotor blade 22. For instance, in one embodiment, the blade sock 100 may be lowered from the hub 20 via the lift cables 106 to a location immediately below the blade tip 26. The blade sock 100 may then be raised using the lift cables 106 such that the blade tip 26 is received within the closed-shape or loop formed by the sock strap 114. Thereafter, the blade sock 100 may be pulled upwardly along the span 38 of the rotor blade 22 towards the blade root 24 until the sock strap 114 tightens around the outer perimeter of the rotor blade 22 and the blade sock 100 can no longer be moved upwardly along the blade 22.

Additionally, as illustrated in FIG. 29, in contrast to the embodiments described above with reference to FIGS. 4-8, the blade sock 100 is shown as including only a trailing edge support 118. However, in other embodiments, the blade sock 100 shown in FIG. 29 may only include a leading edge support 116 or may include both a leading edge support and a trailing edge support (e.g., similar to that shown in FIGS. 5, 7 and 8).

Referring back to FIGS. 4 and 5, the edge supports 116, 118 of the blade sock 100 may generally correspond to any suitable rigid support-type members configured to prevent damage to the leading and trailing edges 34, 36 of the rotor blade 22 when the sock strap 114 is tightened around the blade 22 and/or as the blade sock 100 is used to at least partially support the weight of the rotor blade 22 (as will be described below). For example, as shown in FIG. 5, the leading edge support 116 may include side portions 134 configured to extend along portions of the pressure and suction sides 30, 32 of the rotor blade 22 and may also include an edge portion (indicated by bracket 136) extending between the side portions 134 around leading edge 34. Specifically, the edge portion 136 may be configured to define a curved profile generally corresponding to the curved profile of the leading edge 34 of the blade 22 such that the edge portion 136 wraps around and provides a nesting configuration for the leading edge 34. Similarly, the trailing edge support 118 may include side portions 138 configured to extend along portions of the pressure and suction sides 30, 32 of the rotor blade 22 and may also include an edge portion (indicated by bracket 140) extending between the side portions 138 around the trailing edge 36. However, unlike the edge portion 136 of the leading edge support 116, the edge portion 140 may be configured to extend around the trailing edge 36 such that a gap is defined between the trailing edge 36 and the corresponding support 116, thereby providing a buffer to prevent compression forces applied via the tightened sock strap 114 from being directed through the trailing edge 36.

It should be appreciated that the edge supports 116, 118 may generally be configured to be formed from any suitable rigid material. For instance, in one embodiment, the edge supports 116, 118 may be formed from a fiber-reinforced laminate composite, such as a carbon and/or glass fiber-reinforced laminate. Alternatively, the edge supports 116, 118 may be formed from any other suitable rigid material, such as any suitable metal and/or any suitable rigid polymer-containing material. Additionally, in several embodiments, for the portions of the edge supports 116, 118 configured to contact the outer surface of the rotor blade 22, the edge supports 116, 118 may include an inner layer (not shown) formed from a suitable cushioning material in order to protect the blade's outer surface. For instance, the inner layer may be formed from a foamed material or any other suitable soft and/or cushioning material.

It should also be appreciated that, although the edge supports 116, 118 are shown in the illustrated embodiments as two separate components, the edge supports 116, 118 may, instead, be configured as a single component configured to extend around the entire outer perimeter of the rotor blade 22. Additionally, in alternative embodiments, the blade sock 100 may only include one of the edge supports 116, 118 shown in FIGS. 5-8, such as by only including the trailing edge support 118 (e.g., as shown in FIG. 29). Moreover, it should be appreciated that the edge supports 116, 118 may, in several embodiments, be secured to the sock strap 114 using any suitable means, such as by using adhesives or fasteners, by inserting the strap 114 through a portion of each edge support 116, 118 or by using any other suitable attachment/connection means.

Referring particularly now to FIG. 6, as indicated above, the sock cables 108, 110 may, in one embodiment, be configured to be coupled between the blade sock 100 and corresponding winches 112 disposed on and/or adjacent to the wind turbine's support surface 14. In such an embodiment, the positioning of the winches 112 relative to the position of the rotor blade 22 (as mounted on the hub 20) may be selected to ensure that the winches 112 are spaced sufficiently apart from the rotor blade 22 to allow for the orientation of the blade 22 to be adjusted and/or controlled as it is lowered from the hub 20. For example, as shown in FIG. 6, the winches 112 may be positioned a horizontal distance 142 from the rotor blade 22, which may vary depending on the overall length of the blade's span 38. In addition, the winches 112 may be spaced apart from one another in a cross-wise direction such that each sock cable 108, 110 extends from the blade sock 100 at a given cable angle. For instance, in one embodiment, the cable angle 144 may range from about 30 degrees to about 60 degrees, such as from about 35 degrees to about 55 degrees or from about 42 degrees to about 48 degrees and any other subranges therebetween.

It should be appreciated that, as an alternative to the winches 112, the sock cables 108, 110 may be coupled to and/or held in position by any other suitable device, object and/or person positioned on and/or adjacent to the support surface 13. For instance, in one embodiment, sock cables 108, 110 may simply be held by personnel standing on the support surface 14.

Referring now to FIG. 9, once the blade sock 100 is installed onto the rotor blade 22 at the intermediate location 102, the rotor blade 22 may be initially lowered from the hub 22. Specifically, as shown in FIG. 9, the rotor blade 22 may be lowered from the hub 20 by an initial vertical distance 146. As will be described below, such initial lowering of the rotor blade 22 may allow for one or more pulleys to be coupled between the blade 22 and another up-tower component of the wind turbine 10, thereby providing a means for further lowering the rotor blade 22 in the direction of the support surface 14. Thus, the initial vertical distance 146 may generally correspond to any suitable distance that allows for the installation of the pulley(s) and any associated pulley cable(s). For example, in one embodiment, the initial vertical distance 146 may generally range from about 2 feet to about 15 feet, such as from about 3 feet to about 10 feet or from about 5 feet to about 10 feet and any other subranges therebetween.

Referring now to FIGS. 10-12, one embodiment of suitable components that may be included within a lowering system to initially lower the rotor blade 22 from the hub 20 is illustrated in accordance with aspects of the present subject matter. Specifically, FIG. 10 illustrates a partial perspective view of the hub 20, the rotor blade 22 and the pitch bearing 150 of the wind turbine 10 after the blade 22 has been lowered from the hub 20 by the initial vertical distance 146. FIG. 11 illustrates a partial, cross-sectional view of the interface between the rotor blade 22 and the pitch bearing 150 prior to the blade 22 being lowered relative to the hub 20. Additionally, FIG. 12 illustrates a top view of the pitch bearing 150 of the wind turbine 10, particularly illustrating the relative circumferential positioning of the system components utilized to initially lower the rotor blade 22 relative to the hub 20.

It should be appreciated that, for purposes of illustration, only the inner race of the pitch bearing 150 is shown in FIG. 12. As is generally understood, the pitch bearing 150 may also include an outer race configured to be coupled to the hub 20. As such, when the inner race is rotated relative to the outer race of the pitch bearing 150, the rotor blade 22 may be pitched about its pitch axis.

As particularly shown in FIG. 11, to allow the rotor blade 22 to be initially lowered, several of the root bolts 46 extending through the bolt holes 151 defined in the pitch bearing 150 may be removed and replaced with suitable support cables 152. For example, as shown in FIG. 10, in one embodiment, eight of the root bolts 46 may be removed and replaced with corresponding support cables 152. In doing so, the remainder of the root bolts 46 may be initially maintained in engagement with the pitch bearing 150 (e.g., via suitable attachment nuts (not shown)) to allow the rotor blade 22 to continue to be supported by the hub 20 until the rotor blade 22 is ready to be lowered.

In general, the support cables 152 may correspond to any suitable cables that are capable of supporting the weight of the rotor blade 22 as it is being lowered relative to the hub 20. For example, in several embodiments, each support cable 152 may correspond to a steel cable or any other suitable wire rope that has a rated load capacity sufficient to handle the weight of the rotor blade 22. In another embodiment, each support cable 152 may correspond to a metal chain or any other suitable elongated cable-like object. Moreover, it should be appreciated that each support cable 152 may generally be configured to define any suitable length that permits the cables to be utilized to lower the rotor blade 22 away from the hub 20 by the initial vertical distance 146.

In addition, the support cables 152 may generally be configured to be coupled to the rotor blade 22 using any suitable attachment means. For example, as shown in the illustrated embodiment, a stud end 154 (FIG. 11) of each cable 152 may be coupled to a threaded cable stud 156 configured to be screwed into one of the barrel nuts 44 extending within the blade root 24. In such an embodiment, a swaged or other suitable connection may be formed between the root end 154 of each cable 152 and each cable stud 156 to securely couple to the cables 152 to the corresponding studs 156. In other embodiments, the support cables 152 may be coupled to the blade root 24 using any other suitable means, such as by coupling each support cable 152 to a suitable mounting fixture configured to be secured to the blade root 24 (e.g., similar to the fixture 200 shown in FIG. 19).

It should be appreciated that, in embodiments in which the support cables 152 are coupled to the blade root 24 via the threaded cable studs 156, each cable stud 156 may generally be configured to define any suitable length 157. As shown in FIG. 11, in one embodiment, the length 157 of each cable stud 156 may be substantially equal to a corresponding length 159 of the root bolts 46. Alternatively, as shown in the embodiment of FIG. 13, the length 157 of each cable stud 156 may be less than the length 159 of the root bolts 46.

As shown in FIGS. 10 and 11, each support cable 152 may be configured to be in operative association with a suitable cable translation device 158 positioned within the hub 20. In general, each cable translation device 158 may correspond to any suitable device that allows for the rotor blade 22 to be safely and securely moved relative to the hub 20 using the support cables 152. For example, in several embodiments, each cable translation device 158 may correspond to a fluid-driven actuator (e.g., a hydraulic or pneumatic actuator) configured to be in operative association with a corresponding support cable 152 to allow the rotor blade 22 to be lowered and/or raised relative to the hub 20.

Specifically, in a particular embodiment of the present subject matter, each cable translation device 158 may be configured as a hollow lifting/lowering cylinder or as a single strand jack designed to incrementally lower and/or raise the rotor blade 22. For example, as shown in FIG. 11, each device 158 may include a cylinder 160 configured to be coupled to the pitch bearing 150 (e.g., via suitable bolts and/or other mechanical fasteners (not shown)) and a hollow piston 162 configured to receive one of the support cables 152. The piston 162 may generally be configured to be actuated and retracted relative to the cylinder 160 by supplying/expelling a pressurized fluid to/from the cylinder 160 (e.g., via fluid port 164). In addition, each cable translation device 158 may include an upper clamping mechanism 166 positioned directly above the piston 162 and a lower clamping mechanism 168 positioned directly below the piston 162. As is generally understood, the upper and lower clamping mechanisms 166, 168 may be configured to alternatively clamp the support cable 152 as the piston 162 is actuated and retracted, thereby allowing each translation device 152 to lower or raise the rotor blade 22 in short increments with each actuation/retraction of the piston 162.

Additionally, in several embodiments, a stop block 170 may be configured to be installed around each support cable 152 directly above its corresponding cable translation device 158. In general, each stop block 170 may be configured to serve as a built-in safety feature providing a mechanical stop for each support cable 152 in the event of failure of one of the cable translation devices 158. For example, as particularly shown in FIG. 11, each support cable 152 may include a plurality of lugs 172 spaced apart incrementally along the cable's length. In such an embodiment, an opening or slot (not shown) may be defined through each stop block 170 that is dimensionally larger than the cable 152, thereby allowing the cable 152 to pass through the stop block 170 as it is being lowered relative to the translation device 158. However, given their increased size, the lugs 172 may not be capable of passing through the opening or slot defined in each stop block 170. Accordingly, in the event of failure of one of the cable translation devices 158, the lug 172 positioned immediately above the corresponding stop block 170 may come into contact with and engage an upper surface of the block 170, thereby preventing further motion of the support cable 152 relative to the translation device 158. In contrast, during normal operation, the stop blocks 170 may be continuously repositioned along the support cable 152 as each lug 172 is lowered down onto and/or adjacent to its corresponding stop block 170. For example, as indicated by the dashed lines in FIG. 11, when one of the lugs 172 is lowered down into and/or adjacent to one of the stop blocks 170, the stop block 170 may be removed from the support cable 152 and repositioned above such lug 172 to allow the support cable 152 to continue to be lowered through the translation device 158.

It should be appreciated that, in general, each support cable 152 and corresponding translation device 152 may be configured to be installed at any suitable location around the circumference of the blade root 24 and pitch bearing 150. However, in several embodiments, the cables/devices 152, 158 may be grouped in pairs spaced apart around the blade root 24 and pitch bearing 150. For example, as shown in FIG. 12, in one embodiment, each pair of the cable translation devices 158 may be configured to be positioned around the pitch bearing 150 at circumferential locations generally adjacent to a reference line 174 oriented perpendicularly to a tower reference line 176 extending radially from the center of the wind turbine's tower 12 through the center of the pitch bearing 150. Specifically, as shown, each pair of the cable translation devices 158 may generally be spaced apart circumferentially from the reference line 174 by an angle 178 equal to less than about 45 degrees, such as less than about 40 degrees or less than about 35 degrees. Of course, in such an embodiment, the support cables 152 may similarly be secured to the blade root 24 at corresponding circumferential location relative to the reference line 174. Such positioning of the cables/devices 152, 158 adjacent to the reference line 174 may, in certain rotor blade configurations, allow for the rotor blade 22 to be slightly angled away from the tower 12 as the blade 22 is being lowered relative to the hub 20 due to the location of the blade's center of gravity.

As indicated above, in one embodiment, eight support cables 152 and corresponding translation devices 158 may be installed to assist in lowering the rotor blade 22 relative to the hub 20. However, in other embodiments, any other suitable number of support cables 152 and translation devices 158 may be utilized to lower the rotor blade 22 relative to the hub 20. For instance, in one embodiment, the rotor blade 22 may be lowered using only four cables/devices 152, 158 or using only two cables/devices 152, 158.

Additionally, in other embodiments, only a portion of the support cables 152 coupled to the rotor blade 22 may be configured to be in operative associated with corresponding cable translation devices 158. For instance, FIG. 13 illustrates an alternative embodiment to the embodiment shown in FIG. 11. As shown in FIG. 13, for each pair of support cables 152 extending from the blade root 24, one of the cables 152 may be configured to be in operative association with a corresponding translation device 158 positioned within the hub 20. In such an embodiment, each support cable 152 not associated with a translation device 158 may simply be used to provide additional support for the rotor blade 22 as it is being lowered. In addition, such support cables 152 may also be configured to be utilized in connection with the stop blocks 170 described above. For instance, as shown in FIG. 13, the stop block 170 may be positioned directly above the pitch bearing 150 to allow the stop block 170 to be engaged between one of the cable lugs 172 and the pitch bearing 150 in the event of failure of one or more of the translation devices 158 installed on any of the other support cables 152.

It should be appreciated that, in further embodiments of the present subject matter, the rotor blade 22 may be configured to be initially lowered from the hub 20 using any other suitable lowering means known in the art. For instance, as an alternative to the fluid-driven cable translation devices 158 described above, the cable translation devices may correspond to winches positioned within the hub 20. In such an embodiment, the support cables 152 may be unwound from each associated winch in order to initially lower the rotor blade 22 from the hub 20. In another embodiment, the support cables 152 may be replaced with elongated threaded rods. In such an embodiment, the threaded rods may be received within a suitable translation device (e.g., a screw jack) configured to allow the rods to be moved relative to the device, thereby allowing the rotor blade 22 to be lowered relative to the hub 20.

Referring now to FIGS. 26-28, another embodiment of suitable components that may be included within a lowering system to initially lower the rotor blade 22 from the hub 20 is illustrated in accordance with aspects of the present subject matter. Specifically, FIG. 26 illustrates a partial perspective view of the hub 20, the rotor blade 22 and the pitch bearing 150 of the wind turbine 10 after the blade 22 has been lowered from the hub 20 by the initial vertical distance 146. FIG. 27 illustrates a partial, perspective view of the interior of the hub 20 at the interface between the rotor blade 22 and the pitch bearing 150 prior to the blade 22 being lowered relative to the hub 20. Additionally, FIG. 28 illustrates a perspective view of one embodiment of a modified barrel-type support nut 300 configured for use in the illustrated lowered system in accordance with aspects of the present subject matter.

As particularly shown in FIGS. 26 and 27, to allow the rotor blade 22 to be initially lowered, several of the root bolts 46 extending through the bolt holes 151 defined in the pitch bearing 150 may be removed. The existing barrel nuts 44 associated with such bolts 46 may then be replaced with cylindrically-shaped support nuts 300, with each support nut 300 being configured to allow a corresponding support cable 302 to be coupled to the blade root 24. For example, as shown in FIG. 26, in one embodiment, four of the existing barrel nuts 44 may be removed and replaced with suitable support nuts 300. In doing so, the remainder of the root bolts 46 may be initially maintained in engagement with the pitch bearing 150 (e.g., via suitable attachment nuts 304 (FIG. 27) to allow the rotor blade 22 to continue to be supported by the hub 20 until the rotor blade 22 is ready to be lowered.

It should be appreciated that the support nuts 300 may generally have any suitable configuration that allows each support nut 300 to be inserted through the blade root 24 in place of one of the existing barrel nuts 44 as well as to provide a means for coupling each support cable 302 to the rotor blade 22. For example, in one embodiment, each support nut 300 may be configured as a modified barrel nut. For instance, as shown in FIG. 28, each support nut 300 may include a threaded opening 306 extending vertically through the support nut 300 to allow a corresponding root bolt 46 or other suitable threaded member to be coupled to the nut 300 and extend vertically therefrom. In addition, each support nut 300 may include a laterally extending threaded opening 308 defined through one of the sides of the nut 300. As shown in FIG. 28, such opening 308 may allow for a suitable coupling device 310 (e.g., a swivel eye, mount ring, mount hook or any other suitable attachment mechanism) to be secured to the support nut 300 for coupling each support cable 302 to the rotor blade 22.

As indicated above, in one embodiment, four support nuts 300 may be installed through the blade root 24 in place of the existing barrel nuts 44 to allow four corresponding support cables 302 to be coupled to the rotor blade 22. However, in other embodiments, any other suitable number of support nuts 300 may be secured within the blade root 24 to provide a means for coupling a corresponding number of support cables 302 to the rotor blade 22, such as by installing less than four support nuts 300 within the blade root 24 (e.g., two or three support nuts) or greater than four support nuts 300 within the blade root 24 (e.g., five, six or more support nuts).

Additionally, it should be appreciated that the support nuts 300 may be configured to be maintained in position relative to the rotor blade 22 using any suitable attachment means. For instance, in one embodiment, once a given support nut 300 is inserted within the blade root 24, a corresponding root bolt 46 may be inserted through the pitch bearing 150 and screwed into the vertically extending opening 306 of the support nut 300 in order to secure the nut 300 within the blade root 24. Alternatively, as shown in FIG. 27, an alignment pin 312 may be configured to be inserted through the pitch bearing 150 and screwed into the vertically extending opening 306 of each support nut 300. In such an embodiment, each alignment pin 312 may generally be configured for attachment within the corresponding support nut 300 in a manner similar to the existing root bolts 46 and, thus, may include a threaded end 314 for engaging the threaded opening 306 of the support nut 300. However, as shown in FIG. 27, each alignment pin 312 may define a vertical height or length 316 that is greater than the length 159 (FIG. 11) of the root bolts 46. Accordingly, the alignment pins 312 may also be utilized to align the rotor blade with pitch bearing as the rotor blade (or a different rotor blade with the alignment pins installed therein) is being lifted up onto the hub.

In a further embodiment, the support nuts 300 may be secured within the blade root 24 using the threaded cable studs 156 of the support cables 152 described above with reference to FIGS. 10-13. In such an embodiment, the support cables 152 may be utilized as additional safety features for the system as the rotor blade 22 is being lowered relative to the hub 20. For example, as described above with reference to FIG. 13, the disclosed stop blocks 170 may be utilized without the cable translation devices 158 to allow each block 170 to serve as a mechanical stop between the pitch bearing 150 and the adjacent lugs 172 of the support cables 152 as the rotor blade 22 is being lowered.

It should also be appreciated that each support nut 300 may generally be configured to be installed within the rotor blade 22 at any suitable circumferential location around the blade root 24. However, in several embodiments, the support nuts 300 may be configured to be installed at the same or similar locations to the circumferential locations for the cables/devices 152/158 described above with reference to FIG. 12. For instance, in one embodiment, the support nuts 300 may be configured to be installed within the blade root 24 at circumferential locations spaced apart from the reference line 174 by a given angle 178 (FIG. 12), wherein the angle is generally equal to less than about 45 degrees.

Referring particularly to FIGS. 26 and 27, in several embodiments, each support cable 302 may be configured to extend from one of the support nuts 300 to a corresponding cable translation device 318 positioned within the hub 20. As shown in FIG. 27, in one embodiment, the cable translation device 318 may correspond to cable hoists (including chain hoists) configured to be mounted to and/or supported by any suitable wind turbine component(s) positioned within the hub 20 (e.g., the hub gusset(s), joist(s) and/or any other suitable component(s)). As is generally understood, cable hoists may be configured to allow suitable cables to be passed therethrough in a controlled manner. Thus, in the present application, such cable hoists may be utilized to safely and effectively lower the rotor blade 22 relative to the hub 20.

It should be appreciated that, when utilizing cable hoists as a means for initially lowering the rotor blade 22, the cable(s) associated with each cable hoist may be configured to be pulled through the hoist manually or automatically using a motor. For instance, FIG. 30 illustrates one embodiment of a motorized cable translation device 318 that may be utilized to safely and effectively lower and/or raise the rotor blade 22 relative to the hub 20. As shown, the cable translation device 318 includes a chain or cable hoist 340 and a drive unit 342 coupled to the cable hoist 340 for raising and lowering the support cable 302 controlled by the hoist 340. In general, the cable hoist 340 may correspond to any suitable cable or chain hoist known in the art. For example, an endless drive chain or cable 344 may be provided in operative association with the cable hoist 340 to allow the hoist 340 to be operated manually. Specifically, as is generally understood, the drive cable 344 may be engaged with an input pulley or gear mechanism (not shown) within the hoist 340 that is directly or indirectly (e.g., via one or more intermediate pulley or gear mechanisms) coupled to an output pulley or gear mechanism (not shown) associated with the support cable 302. The various pulley/gear mechanisms generally provide for the mechanical advantage of the hoist 340. Thus, by pulling the endless drive cable 344 in one direction or the other, rotational movement of the input pulley/gear mechanism is translated to the output pulley/gear mechanism, thereby raising or lowering the support cable 302 and, thus, the rotor blade 22 relative to the hub 20.

Additionally, as shown in FIG. 30, the drive unit 342 may include a motor 346 configured to be directly or indirectly coupled to the input pulley/gear mechanism of the hoist 340. For example, as shown in the illustrated embodiment, the motor 346 is coupled to the hoist 340 via an external gear reduction 348. However, in other embodiments, the motor 346 may be directly coupled to the input pulley/gear mechanism of the hoist 340.

In general, the motor 346 may be configured to rotationally drive the internal pulley/gear mechanisms of the hoist 340, thereby allowing the support cable 302 to be lowered and/or raised in a more efficient and effective manner than manually pulling the endless drive cable 344. For example, the ratio of motions for a high load cable hoist (e.g., a 10 ton hoist) is typically relatively high, such as 400:1. Thus, to raise or lower the rotor blade 22 one foot, the drive cable 344 must be pulled 400 feet. As a result, manual operation of the cable hoist 340 may be extremely tiring and inefficient for service personnel. In contrast, the motor 346 may allow for the hoist to be operated effortlessly and at increased speeds, thereby reducing operator fatigue and increasing efficiency.

It should be appreciated that the motor 346 may generally correspond to any suitable motor, such as an electric motor, a hydraulic motor, an air motor and/or any other suitable device that provide a rotational output at a suitable torque. However, in several embodiments, the motor 346 may correspond to an electric, angled output motor having a final output shaft that is angled relative to the primary motor drive. For instance, as shown in the illustrated embodiment, the motor 346 includes a final output shaft (not shown) extending along an output axis 350 defined at a non-zero angle 354 (e.g., a 90 degree angle) relative to a primary drive axis 352 of the motor 346. Such a configuration may allow for the drive unit 342 of the corresponding cable translation device 318 to be relatively compact, thereby enhancing the ease of use of the cable translation device 318 within the small internal space of the hub 20.

It should also be appreciated that, when using the motor 346 to drive the hoist 340, the endless drive cable 344 may be removed from the hoist 340, such as by cutting the drive cable 344 and pulling it from the hoist. However, as shown in FIG. 30, the endless drive cable 344 may also be maintained on the hoist 340 to allow the hoist 344 to be re-configured for manual operation if desired.

As indicated above, the drive unit 342 may optionally include a gear reduction 348 coupled between the motor 346 and the hoist 340. For example, it may be desirable for the input pulley/gear mechanism of the hoist 340 to be rotated at a speed that is less than the output speed of the motor 346. In such instance, the gear reduction 348 may be provided between the motor 346 and the hoist 340 to allow for the desired speed reduction.

It should be appreciated that, although the motorized cable translation device 318 is described herein with reference to its use within a system for raising and/or lowering a rotor blade 22 relative to a wind turbine hub 20, the cable translation device 318 shown in FIG. 30 may be utilized within any other suitable application to provide a compact, motorized device capable of raising and/or lowering a load.

Additionally, it should be appreciated that, in alternative embodiments, the cable translation devices 318 may correspond to any other suitable devices and/or mechanisms that allow for the rotor blade 22 to be lowered relative to the hub 20 via the corresponding support cables 302. For instance, in another embodiment, the cable translation devices 318 may correspond to winches positioned within the hub 20.

It should also be appreciated that, similar to the support cables 152 described above, each support cable 302 may generally correspond to any suitable elongated cable-like object that has a rated load capacity sufficient to handle the weight of the rotor blade 22. For instance, as shown in the illustrated embodiment, the support cables 302 are configured as metal chains. However, in other embodiments, the support cables 302 may correspond to steel cables or any other suitable wire ropes. Moreover, it should be appreciated that each support cable 302 may generally be configured to define any suitable length that permits the cables 302 to be utilized to lower the rotor blade 22 away from the hub 20 by the initial vertical distance 146.

Referring now to FIG. 14, after lowering the rotor blade 22 from the hub 20 by the initial distance 146 (FIG. 9), a plurality of pulleys 180, 182 may be used to coupled one or more pulley cables 186 between the rotor blade 22 and a corresponding winch 188 supported on and/or adjacent to the support surface 14. For example, as shown in FIG. 14, the pulley cable(s) 186 may be configured to be operatively coupled around one or more pulleys 180, 182 coupled to the rotor blade 22 and/or to one or more of the other up-tower components of the wind turbine 10 (e.g., the hub 20 or the pitch bearing 150). In addition, a secondary pulley 184 may be coupled to a heel block 190 supported on and/or adjacent to the support surface 14 that is configured to serve as counter weight for the rotor blade 22. For example, in one embodiment, the heel block 190 may correspond to a large concrete pad or block having a total weight exceeding the weight of the rotor blade 22. Regardless, by coupling the pulley cable(s) 186 between the winch 188 and the rotor blade 22 via the pulleys 180, 182, 184, the pulley cable(s) 186 may be slowly unwound or otherwise released from the winch 188, thereby allowing the rotor blade 22 to lowered from the hub 20 in a controlled manner.

It should be appreciated that, as the rotor blade 22 is being lowered using the pulley cable(s) 186, the sock cables 108, 110 may be used as tag lines to control the orientation of the rotor blade 22. Specifically, by controlling the tension within the sock cables 108, 110 (e.g., using the winches 112), the rotor blade 22 may be maintained a safe distance away from the tower 12. In addition, as will be described below with reference to FIGS. 21-23, the sock cables 108, 110 (or other suitable cables coupled to the blade sock 100 in place of such cables 108, 110) may also be utilized to rotate the rotor blade 22 into a generally horizontal position prior to lowering the blade 22 onto and/or directly adjacent to support surface 14.

Referring now to FIGS. 15-18, various examples of different pulley arrangements are illustrated in accordance with aspects of the present subject matter. Specifically, in each example shown in FIGS. 15-18, one or more up-tower pulleys 180 are coupled to the pitch bearing 150 and one or more blade pulleys 182 are coupled to the rotor blade 22. However, in other embodiments, the up-tower pulley(s) 180 may be configured to be coupled to any other suitable up-tower component(s) of the wind turbine 10. For instance, as an alternative to coupling the up-tower pulley(s) 180 to the pitch bearing 150, such pulley(s) 180 may be coupled to the hub 20 (e.g., by coupling the pulley(s) 180 within the interior of the hub 20), the nacelle 16 or any other suitable up-tower component of the wind turbine 10.

As shown in FIG. 15, in one embodiment, a single up-tower pulley 180 may be coupled to the pitch bearing 150 and first and second blade pulleys 182A, 182B may be coupled to the blade root 24 of the rotor blade 22. In such an embodiment, the up-tower pulley 180 may, for example, be vertically aligned with one of the blade pulleys (e.g., the first blade pulley 180A) on a first side of the blade/bearing 22,150, with the other blade pulley (e.g., the second blade pulley 180B) being positioned on an opposite of the blade 22. Additionally, as shown in FIG. 15, a pulley cable 186 may be coupled to the pitch bearing 150 (or the hub 20) at an attachment location 192 such that the cable 186 may be operatively coupled around the pulleys 180, 182A, 182B as it extends between the attachment location 192 and the corresponding winch 188 (FIG. 14) positioned on and/or adjacent to the support surface 14 of the wind turbine 10. Thus, as the pulley cable 186 is unwound from or otherwise released by the winch 188, the cable 186 may follow a path (as indicated by arrows 194) extending from the up-tower pulley 180 around the first blade pulley 182A and then around the second blade pulley 182B as the rotor blade 22 is lowered.

In another embodiment, as shown in FIG. 16, first and second up-tower pulleys 180A, 180B may be coupled to the pitch bearing 150 and first and second blade pulleys 182A, 182N may be coupled to the blade root 24 of the rotor blade 22. In such an embodiment, the first up-tower pulley 180A may, for example, be vertically aligned with one of the blade pulleys (e.g., the first blade pulley 182A) on a first side of the blade/bearing 22, 150, with the other blade pulley (e.g., the second blade pulley 182B) being positioned on an opposite of the blade 22. Additionally, the second up-tower pulley 180B may be positioned at a location defined horizontally between the first and second blade pulleys 182A, 182B. Moreover, as shown in FIG. 16, a pulley cable 186 may be coupled to the pitch bearing 150 (or the hub 20) at an attachment location 192 such that the cable 186 may be operatively coupled around the pulleys 180A, 180B, 182A, 182B as it extends between the attachment location 192 and the corresponding winch 188 (FIG. 14) positioned on and/or adjacent to the support surface 14 of the wind turbine 10. Thus, as the pulley cable 186 is unwound from or otherwise released by the winch 188, the cable 186 may follow a path (as indicated by arrows 194) from the first up-tower pulley 180A around the first blade pulley 182A and then from the second up-tower pulley 180B around the second blade pulley 182B as the rotor blade 22 is being lowered.

In a further embodiment, as shown in FIG. 17, first and second up-tower pulleys 180A, 180B may be coupled to the pitch bearing 150 and first and second blade pulleys 182A, 182B may be coupled to the blade root 24 of the rotor blade 22. However, unlike the example shown in FIG. 17, the first up-tower pulley 180A may be vertically aligned with one of the blade pulleys (e.g., the first blade pulley 182A) on a first side of the blade/bearing 22,150 and the second up-tower pulley 180B may be vertically aligned with the other blade pulley (e.g., the second blade pulley 182B) on an opposite of the blade/bearing 22, 150. Additionally, as shown in FIG. 17, a pulley cable 186 may be coupled to the blade root 24 at an attachment location 192 such that the cable 186 may be operatively coupled around the pulleys 180A, 180B, 182A, 182B as it extends between the attachment location 192 and the corresponding winch 188 (FIG. 14) positioned on and/or adjacent to the support surface 14 of the wind turbine 10. Thus, as the pulley cable 186 is unwound from or otherwise released by the winch 188, the cable 186 may follow a path (as indicated by arrows 194) extending from the first up-tower pulley 180A around the first blade pulley 182A and then from the second up-tower pulley 180B around the second blade pulley 182B as the rotor blade 22 is being lowered.

As yet another example, as shown in FIG. 18, a single up-tower pulley 180 may be coupled to the pitch bearing 150 and a single blade pulley 182 may be coupled to the blade root 24 of the rotor blade 22. In such an embodiment, one or both of the pulleys 180, 182 may correspond to a double pulley. For instance, as shown in FIG. 18, the up-tower pulley 180 is configured as a double pulley and, thus, includes both a first pulley slot 195 and a second pulley slot 196 for receiving a cable. Additionally, as shown in FIG. 18, a pulley cable 186 may be coupled to the blade root 24 at an attachment location 192 such that the cable 186 may be operatively coupled around the pulleys 180, 182 as it extends between the attachment location 192 and the corresponding winch 188 (FIG. 14) positioned on and/or adjacent to the support surface 14 of the wind turbine 10. Thus, as the pulley cable 186 is unwound from or otherwise released by the winch 188, the cable 186 may follow a path (as indicated by arrows 194) extending from the first pulley slot 195 of the up-tower pulley 180 around the blade pulley 182 and then back around the second pulley slot 196 of the up-tower pulley 180.

It should be appreciated that the various blade pulleys 180 described above may generally be configured to be coupled to the blade root 24 using any suitable attachment means known in the art. For instance, in one embodiment, the pulley(s) 180 may be coupled directly to one or more of the root bolts 46 extending outwardly from the blade root 24. Alternatively, each pulley 180 may be configured to be coupled to the rotor blade 22 via a suitable mounting device or fixture secured to the blade root 24. For example, FIG. 19 illustrates a side view of one embodiment of a suitable mounting fixture 200 for coupling one or more of the blade pulleys 180 to the blade root 24. As shown, the fixture 200 may include a mount block 202 defining a plurality of bolt holes 204 (e.g., two along each side of the fixture 200) configured to receive the root bolts 46. Thus, when the fixture 200 is installed onto the rotor blade 22 such that a bottom surface 206 of the fixture 200 is contacting the root end 48 of the blade 22, a corresponding number of root bolt 46s may extend through the bolt holes 204 to allow the fixture 200 to be coupled to the rotor blade 22 (e.g., via suitable attachment nuts 208). Additionally, as shown in FIG. 18, the fixture 200 may include a coupling ring 210 or other suitable device extending from the mount block 202 to allow the corresponding blade pulley 180 to be coupled to the fixture 200 (e.g., via a mounting hook 212 of the pulley 180).

Similarly, each up-tower pulley 180 may be configured to be coupled to the pitch bearing 150 (or any other up-tower component of the wind turbine 10) using any suitable attachment means. For instance, in one embodiment, a similar fixture as that shown in FIG. 19 may be utilized to couple each up-tower pulley 180 to the pitch bearing 150. Alternatively, a portion of each up-tower pulley 180 may be configured to be received through one or more of the existing bolt holes 151 defined through the pitch bearing 150 such that the up-tower pulley(s) 180 may be coupled to the pitch bearing 150 using a suitable attachment nut(s) or any other suitable attachment device(s).

Referring now to FIG. 20, yet another embodiment of a suitable pulley arrangement is illustrated in accordance with aspects of the present subject matter. As shown in FIG. 20, first and second up-tower pulleys 180A, 180B may be supported adjacent to the hub 20 by corresponding support straps 214 extending around the remaining "rabbit-eared" rotor blades 22. Specifically, the first up-tower pulley 180A may be supported by a first support strap 214 extending around one of the remaining rotor blades 22 and the second up-tower pulley 180B may be supported by a second support strap 216 extending around the other remaining rotor blade 22. In such an embodiment, first and second pulleys cables 186A, 186B may be configured to be coupled between the rotor blade 22 and a corresponding winch(es) 188 supported on and/or adjacent to the support surface 14. Thus, as the pulley cables 186A, 186B are unwound from or otherwise released by the winch(es) 188, each cable 186A, 186B may extend up to and around its corresponding up-tower pulley 180A, 180B (as indicated by arrows 194) to allow the rotor blade 22 to be lowered relative to the hub 20 in a controlled manner.

Additionally, a rigid structure may also be installed onto and/or around the remaining rotor blades 22 to provide additional support for the support straps 214, 216 and/or to maintain the spacing defined between the straps 214, 216 and the hub 20. For example, as shown in FIG. 20, a pair of rigid bars 218 (one bar from each pair being shown) may be supported adjacent to the blade root 24 of each remaining rotor blade 22 using first and second straps 220, 222 configured to extend over and around portions of the blade root 24, the pitch bearing 150 and/or the hub 20. In such an embodiment, a suitable coupling device 224 (e.g., a mounting ring or eyelet) may be positioned or formed at the outboard end of each rigid bar 218 for receiving the adjacent support strap 214, 216.

Referring now to FIGS. 21-23, upon installation of the pulleys 180, 182, the rotor blade 22 may be lowered down onto and/or adjacent to the support surface 14 using the associated pulley cable(s) 186. In doing so, the sock cables 108, 110 coupled to the blade sock 100 may be used to initially control the orientation of the rotor blade 22. For example, as indicated above, as the rotor blade 22 begins to be lowered in the direction of the support surface 14 via the pulley cable(s) 186, the tension within the sock cables 108, 110 may be controlled (e.g., via the winches 114) in a manner that prevents the rotor blade 22 from contacting the wind turbine tower 12, such as by using the sock cables 108, 110 to angle the rotor blade 22 away from the tower 12.

Additionally, as the rotor blade 22 is further lowered towards the support surface 14, the sock cables 108, 110 (or any other suitable cables coupled to the blade sock 100 in place of the sock cables 108, 110) may be utilized to rotate the rotor blade 22 into a generally horizontal position in order to prevent the blade tip 24 from contacting the support surface 14 and to properly orient the rotor blade 22 relative to the support surface 14. For example, as shown in FIGS. 21 and 22, when the rotor blade 22 is lowered to a given position relative to the support surface 14, the sock cables 108, 110 may be coupled to a small crane 230 or replaced with suitable cables 232 extending from the crane 230 (as shown in FIGS. 21 and 22). Thus, as the pulley cable(s) 186 is being released in a controlled manner so as to lower the rotor blade 22 in the direction of the support surface 14, the crane cable(s) 232 may be used to apply an upward force through the blade sock 100 in order to cause the rotor blade 22 to rotate into a generally horizontal position. For example, as shown in FIG. 22, the rotor blade 22 may be rotated so as to have a horizontal orientation extending generally parallel to the support surface 14. The pulley cable(s) 186 and the crane cable(s) 232 may then be used to lower the rotor blade 22 down onto the support surface 14 or onto suitable blade supports positioned on the support surface 14.

It should be appreciated that, as an alternative to using the crane 230, any other suitable structure, device and/or vehicle may be utilized to allow the rotor blade 22 to be rotated into the horizontal position shown in FIGS. 22 and 23. For instance, a mobile tower structure may be installed at the wind turbine site that includes a suitable pulley(s) coupled to the top of the structure. In such an embodiment, the sock cables 108, 110 and/or any other suitable cable(s) may be coupled around the pulley(s) and may extend to suitable winches (e.g., winches 114) for controlling the tension within such cable(s) as the rotor blade 22 is being lowered.

It should also be appreciated that the present subject matter is also directed to methods for installing a rotor blade 22 onto a wind turbine 10. As indicated above, such installation methods may be performed simply by reversing the various method steps described above for removing a rotor blade 22 from a wind turbine 10. Specifically, the rotor blade 22 to be installed onto the wind turbine 10 may be initially placed on and/or adjacent to the support surface 14 at a location proximal to the wind turbine tower 12. A suitable pulley cable(s) 186 may then be coupled between the rotor blade 22 and a corresponding winch 188 using one or more up-tower pulley(s) 180 coupled to an up-tower component of the wind turbine (e.g., the pitch bearing 150 or the hub 20) and/or one or more blade pulleys 182 coupled to the blade root 24 of the rotor blade 22. In addition, a blade sock 100 may be installed onto the rotor blade 22 at an intermediate location 102 on the blade 22 that includes one or more cables coupled thereto (e.g., sock cables 108, 110 or crane cables 232). The pulley cable(s) 186 and the cable(s) coupled to the blade sock 100 may then be utilized to initially raise the rotor blade 22 away from the support surface 14. Thereafter, as the pulley cable(s) is used to further raise the rotor blade 22 towards the hub 20, the cable(s) coupled to the blade sock 100 may be used to control the orientation of the rotor blade 22 relative to the tower 12, such as by using the cable(s) to allow the rotor blade 22 to rotate from a generally horizontal position to a generally vertical position.

Once the rotor blade 22 is raised to a location adjacent to the hub 20 (e.g., such that the blade 22 is spaced apart from the hub 20 by the vertical distance 146 (FIG. 9), suitable support cables 152, 302 may be coupled to the rotor blade 22 and corresponding cable translation devices 158, 318 may be installed within the hub 20. Thereafter, the pulleys 180, 182 may be removed to allow the translation devices 158, 318 to be used to raise the rotor blade 22 to a location directly adjacent to the hub 20 such that the root bolts 46 are received within the corresponding bolt holes 151 defined in the pitch bearing 150. The root bolts 46 may then be secured to the pitch bearing 150 (e.g., using suitable attachment nuts) in order complete the installation of the rotor blade 22 onto the hub 20.

Referring now to FIGS. 24 and 25, a clamp assembly 400 that may be utilized as an alternative means for coupling one or more cables to the rotor blade 22 for performing any of the various steps of the methods disclosed herein is illustrated in accordance with aspects of the present subject matter. Specifically, FIG. 24 illustrates a perspective view of the clamp assembly 400 installed around a portion of the blade root 24 of a rotor blade 22. Additionally, FIG. 25 illustrates a top view of the clamp assembly 400 and rotor blade 22 shown in FIG. 24.

In general, the clamp assembly 400 may include a plurality of curved clamp members 402 configured to be engaged around the outer circumference of the rotor blade 22. Specifically, each clamp member 402 may be configured to extend circumferentially around a portion of the blade root 24 of the rotor blade 22. In several embodiments, each clamp member 402 may be configured to be coupled to any adjacent clamp member(s) 402 via a pivotal connection. For example, as particularly shown in FIG. 25, a hinge pin 404 may be configured to extend through the ends of each pair of adjacent clamp members 402, thereby allowing such clamp members to be pivoted or rotated relative to one another. As such, when the clamp assembly 400 is properly positioned along the blade root 24 at its desired installation location, the clamp members 402 may be pivoted relative to one another to allow the clamp assembly 400 to be tightened and/or engaged around the blade root 24.

It should be appreciated that, in general, the clamp members 402 may be configured to be actuated or otherwise rotated relative to one another using any suitable actuating means known in the art. For example, in several embodiments, a suitable actuating cylinder 406 (e.g., an electric cylinder or a fluid-driven cylinder) may be coupled between the each pair of adjacent clamp members 402 so that the cylinder 406 extends across the joint formed between the clamp members 402 via the hinge pin 404. As particularly shown in FIG. 25, each actuating cylinder 406 may include a piston cylinder 408 coupled to one of the adjacent clamp members 402 and a piston rod 410 coupled to the other adjacent clamp member 402. As such, when the piston rod 410 is actuated relative to the piston cylinder 408, the adjacent clamp members 402 may be rotated relative to one another, thereby allowing the clamp members 402 to be engaged around and/or disengaged from the rotor blade 22.

As shown in FIGS. 24 and 25, the clamp assembly 400 may also include one or more coupling devices 412, such as mount rings, secured to one or more of the clamp members 402 to allow a suitable cable(s) 414 to be coupled to the assembly 400. For instance, to initially install the clamp assembly 400 around the rotor blade 22, one or more cables 414 may be coupled to the clamp assembly 400 to allow the assembly 400 to be properly positioned vertically relative to the rotor blade 22, such as by coupling suitable lift cables to the clamp assembly 400 so that the assembly 400 may be lifted from the support surface 14 to a desired installation location on the rotor blade 22.

In addition, when lowering the rotor blade 22 relative to the hub 20, a suitable cable(s) 400 may be secured to one or more of the clamp members 402 to allow the rotor blade 22 to be moved in the direction of the support surface 14 via such cable(s). For instance, one or more support cables may be secured to the clamp assembly 400 to allow the rotor blade 22 to be initially lowered from the hub 20 by the initial vertical distance 146 (FIG. 9). Similarly, one or more pulley cables may be coupled to the clamp assembly 400 to allow the rotor blade 22 to be lowered down onto and/or adjacent to the support surface 14. For example, in the embodiment shown in FIG. 20, the pulley cables 180A, 180B may be configured to secured to one or more of the clamp members 402 (via the coupling device(s) 412) such that each cable 180A, 180B extends from the clamp assembly 400 around its corresponding up-tower pulley 180A, 180B to the winch 188 supported on and/or adjacent to the support surface 14. In such an embodiment, the pulley cables 180A, 180B may be utilized to lower the rotor blade 22 directly from the hub 20 to the support surface 14 without the need to install one or more additional system components for further lowering the blade 22 relative to the hub 20.

It should be appreciated that, in several embodiments, one or more clamp pads 416 (FIG. 25) may be secured to one or more of the clamp members 402 such that the clamp pads 416 are positioned directly between the clamp member(s) 402 and the rotor blade 22 when the clamp assembly 400 is installed around the blade root 24. In one embodiment, the clamp pads 416 may have a friction coating or surface that allows for improved gripping of the rotor blade surface when the clamp members 402 are engaged around the blade root 24. Alternatively, the clamp pads 416 may be formed from a foamed material or other suitable cushioning material so as to provide a layer of protection for the outer surface of the rotor blade 22.

Additionally, it should be appreciated that the present subject matter is also directed to various methods for installing a blade sock 100 onto a rotor blade 22 of a wind turbine 10. Specifically, in several embodiments, the blade sock 100 may be initially positioned adjacent to the blade tip 26 of the rotor blade 22 and then moved relative to the rotor blade 22 such that the blade tip 26 is received within the closed-shape formed by the sock strap 114. For example, as indicated above, when the rotor blade 22 is positioned in a vertical orientation (e.g., at the six o'clock position), the blade sock 100 may be configured to be lowered from the hub 20 using the lift cables 106 so as to position the blade sock 100 adjacent to the blade tip 26. The lift cables 106 may then be used to lift the blade sock 100 upwards relative to the rotor blade 22 such that the blade tip 26 is received within the closed-shape defined by the sock strap 114. Alternatively, a suitable crane may be utilized to position the blade sock 100 adjacent to the blade tip 26 when the rotor blade 22 is vertically oriented. For example, a suitable crane cable(s) may be coupled to the blade sock 100 to allow the sock 100 to be positioned at a location adjacent to the blade tip 26. Thereafter, once the blade tip 26 is aligned with the closed-shape formed by the sock strap 114, the blade sock 100 may be lifted further using the crane cable(s) such that the blade tip 26 is received within the sock strap 114.

Once the blade tip 26 is received within the sock strap 114, the blade sock 100 may then be moved spanwise along the rotor blade 22 towards the blade root 24 until the blade sock 100 is positioned at the desired, intermediate location 102 defined between the blade root 24 and the blade tip 26. At such point, the blade sock 100 may be configured to fit tightly around the outer perimeter of the rotor blade 22. For instance, as indicated above, the blade sock 100 may be coupled to a suitable sock cable(s) 108, 110 that allows a tightening force to be applied through the sock strap 114 when the blade sock 100 is properly located on the rotor blade 22, thereby allowing the sock 100 to be tightened around the outer perimeter of the rotor blade 22. Alternatively, similar to embodiment described above with reference to FIG. 29, the sock strap 100 may form a closed-shape of fixed size that defines an internal area generally corresponding to the cross-sectional area of the rotor blade 22 at the desired intermediate location 102. As such, when the blade sock 100 is being moved spanwise along the rotor blade 22 towards the blade root 24, the sock strap 114 may have fit loosely around the outer perimeter of the rotor blade 22 until the blade sock 100 is moved to the intermediate location 102, at which point the sock strap 114 may be configured to fit tightly around the rotor blade 22 so as to prevent the blade sock 100 from being moved further towards the blade root 24.

It should be appreciated that, although installation of the blade sock 100 has been generally described herein with reference to the rotor blade 22 being in a vertical orientation, the disclosed installation methods may also be utilized to install a blade sock 100 onto a rotor blade 22 that is positioned any other suitable orientation. For example, in several embodiments, the disclosed installation methods may also be utilized to install a blade sock 100 onto a rotor blade 22 positioned at a horizontal orientation (e.g., at a 3 o'clock or a 9 o'clock position). Specifically, in such embodiments, a crane may be utilized to position the blade sock 100 adjacent to the blade tip 26 such that the blade sock 100 may be slid onto the rotor blade 22. Thereafter, the crane cable(s) coupled between the blade sock 100 and the crane may be used to move the blade sock 100 spanwise along the rotor blade 22 to the desired intermediate location 102*n*, at which point the blade sock 100 may be secured tightly around the outer perimeter of the rotor blade 22.

The horizontal installation may allow for the blade sock 100 to be effectively and efficiently installed onto a rotor blade 22 for a variety of different applications, such as when the rotor blade 22 is being removed during the performance of a horizontal blade exchange process or a pitch bearing exchange process or when the entire rotor 18 is being removed (e.g., during a gearbox exchange process). In particular, the horizontal installation methods may allow for an edge support(s) (e.g., the leading edge support 116 and/or the trailing edge support 118) to be easily installed onto a horizontally oriented rotor blade 22.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for installing a blade sock onto a rotor blade of a wind turbine, the method comprising:
    positioning the blade sock adjacent to a blade tip of the rotor blade, the blade sock comprising a sock strap forming a closed-shape;
    moving the blade sock relative to the rotor blade such that the blade tip is received within the closed-shape formed by the sock strap; and,
    moving the blade sock spanwise along the rotor blade towards a blade root of the rotor blade until the blade sock is positioned at an intermediate location defined between the blade root and the blade tip,
    wherein the sock strap is a closed-shape with a fixed perimeter length defining an internal area generally corresponding to a cross-sectional area of the rotor blade at the intermediate location such that the blade sock is prevented from being moved further towards the blade root when it reaches the intermediate location, and
    wherein the intermediate location is defined at an outboard location on the rotor blade that is spaced apart from the blade root by a spanwise distance greater than 50% of a blade span of the rotor blade such that the entirety of the blade sock is located at least the spanwise distance from the blade root.

2. The method of claim 1, wherein moving the blade sock spanwise along the rotor blade towards the blade root comprises moving the blade sock spanwise along the rotor blade towards the blade root until the sock strap tightens around the rotor blade at the intermediate location, the tightening of the sock strap around the rotor blade occurring due to the spanwise movement of the blade sock towards the blade root without any adjustments to the fixed perimeter length of the blade sock.

3. The method of claim 1, wherein the blade sock further comprises at least one edge support configured to be positioned between the sock strap and the rotor blade.

4. The method of claim 3, wherein the at least one edge support comprises a trailing edge support configured to be positioned between the sock strap and a trailing edge of the rotor blade.

5. The method of claim 4, wherein the trailing edge support comprises side portions and an edge portion extending between the side portions, the edge portion being configured to extend around the trailing edge of the rotor blade such that a gap is defined between the trailing edge support and the trailing edge.

6. The method of claim 1, wherein the rotor blade is disposed in a vertical orientation for installation of the blade sock onto the rotor blade.

7. The method of claim 1, wherein the rotor blade is disposed in a horizontal orientation for installation the blade sock onto the rotor blade.

8. The method of claim 1, wherein the spanwise distance is from 65% of the blade span of the rotor blade to 95% of the blade span of the rotor blade.

9. The method of claim 1, wherein the spanwise distance is from 75% of the blade span of the rotor blade to 95% of the blade span of the rotor blade.

* * * * *